United States Patent
Nakamura et al.

(10) Patent No.: US 11,586,471 B2
(45) Date of Patent: Feb. 21, 2023

(54) COMPUTER SYSTEM AND CONTROL METHOD FOR COMPUTER SYSTEM

(71) Applicant: Hitachi, Ltd., Tokyo (JP)

(72) Inventors: Takaki Nakamura, Tokyo (JP); Hitoshi Kamei, Tokyo (JP); Yuki Sakashita, Tokyo (JP); Yoshinori Ohira, Tokyo (JP); Masakuni Agetsuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 123 days.

(21) Appl. No.: 17/200,350

(22) Filed: Mar. 12, 2021

(65) Prior Publication Data
US 2021/0389990 A1 Dec. 16, 2021

(30) Foreign Application Priority Data
Jun. 10, 2020 (JP) .............................. JP2020-100768

(51) Int. Cl.
*G06F 9/50* (2006.01)

(52) U.S. Cl.
CPC .......... *G06F 9/5038* (2013.01); *G06F 9/5088* (2013.01); *G06F 2209/503* (2013.01); *G06F 2209/508* (2013.01)

(58) Field of Classification Search
CPC ................. G06F 9/5038; G06F 9/5088; G06F 2209/503; G06F 2209/508; G06F 2209/5019
See application file for complete search history.

(56) References Cited

U.S. PATENT DOCUMENTS

| | | | |
|---|---|---|---|
| 8,095,929 B1 | 1/2012 | Ji et al. | |
| 8,935,500 B1 | 1/2015 | Gulati et al. | |
| 2014/0317625 A1* | 10/2014 | Ichikawa | G06F 9/45533 718/1 |
| 2015/0095555 A1* | 4/2015 | Asnaashari | G06F 12/0246 711/114 |
| 2015/0370627 A1* | 12/2015 | Nakajima | G06F 11/3409 714/2 |

(Continued)

FOREIGN PATENT DOCUMENTS

| | | |
|---|---|---|
| JP | 2017-091001 A | 5/2017 |
| JP | 2018-028746 A | 2/2018 |
| JP | 2020-052730 A | 4/2020 |

OTHER PUBLICATIONS

Japanese Patent Office, Office Action, Application No. JP 2020-100768, dated Jun. 7, 2022, in 6 pages.

*Primary Examiner* — Sisley N Kim
(74) *Attorney, Agent, or Firm* — Procopio, Cory, Hargreaves & Savitch LLP

(57) ABSTRACT

A computer system is constituted by a plurality of physical computers including a first physical computer and a second physical computer. One or more application instances that perform an application service and a storage service instance that provides a storage service including a volume used by the application instance operate on the first physical computer. The computer system predicts a future resource usage status of the first physical computer, creates a plan to move the one or more application instances operating on the first physical computer to the second physical computer based on the predicted future resource usage status, and executes the created plan.

10 Claims, 22 Drawing Sheets

(56) References Cited

U.S. PATENT DOCUMENTS

2020/0081623 A1* 3/2020 Jayaraman ............ G06F 3/0619
2020/0104151 A1 4/2020 Shibayama et al.
2020/0304571 A1* 9/2020 Ranjan .................. G06F 3/0605

* cited by examiner

FIG. 8

| VOLUME NUMBER | IOPS (IOPS) | | TRANSFER RATE (MB/s) | | STORAGE CAPACITY USAGE AMOUNT (GB) |
|---|---|---|---|---|---|
| | Read | Write | Read | Write | |
| 1 | 10 | 20 | 1 | 2 | 30 |
| 2 | | | | | |
| 3 | | | | | |
| 4 | | | | | |
| 5 | | | | | |
| 6 | | | | | |
| 7 | | | | | |
| 8 | | | | | |
| 9 | | | | | |

TIME →

| APPLICATION CONTAINER NUMBER | | CPU (GHz) 902 | MEMORY (GB) 903 | NETWORK BANDWIDTH (MB/s) 904 | |
|---|---|---|---|---|---|
| 901 | | | | TRANSMISSION | RECEPTION |
| 1 | USAGE AMOUNT | 0.1 | 1 | 10 | 20 |
| | DEFINITION AMOUNT | 1 | 4 | 100 | 100 |
| 2 | USAGE AMOUNT | ... | ... | ... | ... |
| | DEFINITION AMOUNT | | | | |
| 3 | USAGE AMOUNT | | | | |
| | DEFINITION AMOUNT | | | | |
| 4 | USAGE AMOUNT | | | | |
| | DEFINITION AMOUNT | | | | |
| 5 | USAGE AMOUNT | | | | |
| | DEFINITION AMOUNT | | | | |

FIG. 10

| Storage Service Container Number | | CPU (GHz) | Memory (GB) | Network Bandwidth (MB/s) | | Storage Capacity (GB) |
|---|---|---|---|---|---|---|
| | | | | Transmission | Reception | |
| 1 | Usage Amount | 0.5 | 20 | 40 | 50 | 20,000 |
| | Definition Amount | 10 | 40 | 100 | 100 | 40,000 |
| 2 | Usage Amount | ... | ... | ... | ... | ... |
| | Definition Amount | | | | | |
| 3 | Usage Amount | | | | | |
| | Definition Amount | | | | | |
| 4 | Usage Amount | | | | | |
| | Definition Amount | | | | | |
| 5 | Usage Amount | | | | | |
| | Definition Amount | | | | | |

FIG. 11

| Cluster Computer Number | | CPU (GHz) | Memory (GB) | Network Bandwidth (MB/s) | | Storage Capacity (GB) |
|---|---|---|---|---|---|---|
| | | | | Transmission | Reception | |
| 1 | Usage Amount | 10 | 30 | 100 | 120 | 20,000 |
| | Definition Amount | 20 | 100 | 800 | 800 | 40,000 |
| 2 | Usage Amount | ... | ... | ... | ... | ... |
| | Definition Amount | | | | | |
| 3 | Usage Amount | | | | | |
| | Definition Amount | | | | | |
| 4 | Usage Amount | | | | | |
| | Definition Amount | | | | | |
| 5 | Usage Amount | | | | | |
| | Definition Amount | | | | | |

| PLAN MANAGEMENT NUMBER | TARGET OBJECT TYPE | OBJECT NUMBER | ACTION TYPE | ACTION CONTENT |
|---|---|---|---|---|
| 1 | STORAGE SERVICE CONTAINER | 2 | RESOURCE DEFINITION AMOUNT (CPU) INCREASE | + 20GHz |
| 2 | VOLUME | 3 | MOVEMENT | MOVEMENT DESTINATION: STORAGE SERVICE CONTAINER #2 |
| 3 | APPLICATION CONTAINER | 2 | MOVEMENT | MOVEMENT DESTINATION: CLUSTER COMPUTER #2 |
| 4 | ... | ... | ... | ... |
| 5 | | | | |

1201　1202　1203　1204　1205

COMPUTER SYSTEM AND CONTROL METHOD FOR COMPUTER SYSTEM

BACKGROUND OF THE INVENTION

1. Field of the Invention

The present invention relates to a computer system and a control method for a computer system.

2. Description of the Related Art

There is a hyper converged infrastructure (HCI) that is constituted by a plurality of physical computers and in which both a computing service and a storage service run on each physical computer.

In the configuration of the hyper converged infrastructure, a container computing service may run as a container on a container platform running on the physical computer or may run as a virtual computer on a hypervisor running on the physical computer. Here, a container or a virtual computer that provides the computing service is called an application instance.

In the configuration of the hyper converged infrastructure, when the storage service may run as a process on a host OS or hypervisor running on the physical computer, may run as the container on the container platform running on the physical computer, or may run as the virtual computer on the hypervisor running on the physical computer. Here, the process, the container, or the virtual computer that provides the storage service is called a storage service instance. The storage service instance provides a volume to the application instance.

In the hyper converged infrastructure, a resource insufficiency may occur on a certain physical computer and a certain storage service instance. When the resource insufficiency occurs, the resource insufficiency can be resolved by moving the application instance to another physical computer or moving a volume serviced by the storage service instance to a storage service instance running on another physical computer.

U.S. Pat. No. 8,095,929 B discloses an example in which a load balance of a computing service is performed by migrating a virtual computer (VM) between physical computers. U.S. Pat. No. 8,935,500 B discloses an example in which a load balance of a storage service is performed by migrating a disk image (corresponding to a volume for a virtual computer) used by a virtual computer (VM) between LUNs.

SUMMARY OF THE INVENTION

In the configuration of the hyper converged infrastructure, when the technology described in U.S. Pat. No. 8,095,929 B is used, the virtual computer can be moved from the physical computer on which the virtual computer runs and a service of the disk image (corresponding to the volume for the virtual computer) used by the virtual computer is performed to a different physical computer.

In the configuration of the hyper converged infrastructure, when the technology described in U.S. Pat. No. 8,935,500 B is used, the disk image and the service thereof can be moved from the physical computer on which the virtual computer runs and the disk image service used by the virtual computer is provided to a different physical computer.

However, when movement of the application instance is selected as a unit for resolving the resource insufficiency of the physical computer, the application instance is allocated to a physical computer different from the physical computer on which the service of the volume used by the application instance, and thus, communication between the physical computers for the storage service increases. Accordingly, the entire processing efficiency decreases. When the volume used by the application instance is moved to the physical computer as a movement destination of the application instance in order not to decrease the processing efficiency, more resource insufficiency occurs in a period in which the volume movement is executed.

When the movement of the volume is selected as the unit for resolving the resource insufficiency of the storage service instance, more resource insufficiency also occurs in the period in which the volume movement is executed. That is, the achievement of reduction of more resource insufficiency due to the volume movement without decreasing the entire processing efficiency is an issue.

The present invention has been made in consideration of the above issue, and an object thereof is to efficiently resolve a resource insufficiency in a short time in a computer system constituted by a plurality of physical computers on which a storage service and an application operate.

In order to solve the above problem, the present invention provides a computer system constituted by a plurality of physical computers including a first physical computer and a second physical computer. One or more application instances that perform an application service and a storage service instance that provides a storage service including a volume used by the application instance operate on the first physical computer. The computer system predicts a future resource usage status of the first physical computer, creates a plan to move the one or more application instances operating on the first physical computer to the second physical computer based on the predicted future resource usage status, and executes the created plan.

According to the present invention, it is possible to efficiently resolve a resource insufficiency in a short time in a computer system constituted by a plurality of physical computers on which a storage service and an application operate.

BRIEF DESCRIPTION OF THE DRAWINGS

FIG. 6 is a configuration diagram of a volume performance capacity management table according to the embodiment;

FIG. 9 is a configuration diagram of an application container performance management table according to the embodiment;

FIG. 10 is a configuration diagram of a storage service container performance capacity management table according to the embodiment;

FIG. 11 is a configuration diagram of a cluster computer performance capacity management table according to the embodiment;

FIG. 12 is a configuration diagram of a resource insufficiency resolution plan table according to the embodiment;

DESCRIPTION OF THE PREFERRED EMBODIMENTS

Embodiments will be described with reference to the drawings. The embodiments to be described below do not limit inventions according to the claims, and all elements and combinations thereof described in the embodiments are not essential for the solution of the invention.

In the following description, information may be described by the expression of "AAA table", but may be expressed by any data structure. That is, the "AAA table" can be called "AAA information" to show that the information does not depend on the data structure.

In the following description, a "processor unit" is one or more processors. At least one processor is typically a central processing unit (CPU). The processor may include hardware circuits that perform some or all of processing.

Although processing performed with a "program" as an operation subject may be described, the program is executed by a processor (for example, a central processing unit (CPU)), and thus, predetermined processing is appropriately performed by using a storage resource (for example, memory) and/or a communication interface device (for example, port). Accordingly, the subject of the processing may be a processor. The processing described with the program as the operation subject may be processing performed by a device including a processor. A dedicated hardware circuit that performs a part or all of the processing performed by the processor may be included. A computer program may be installed on a device from a program source. The program source may be, for example, a program distribution server or a computer-readable storage medium.

In the following explanation, a "container" may be described as a management target, but a "virtual computer (VM)" which is a virtualization method that emulates hardware of a physical computer or a "bare metal" which is a physical computer itself may be the management target instead of the container.

Embodiment

The present embodiment relates to a technology which is a hyper-converged infrastructure in which a computing service and a storage service operate on a computer system constituted by a plurality of computers, and resolves a resource insufficiency of the computer which is a component of the hyper converged infrastructure (HCI).

Figure 1:
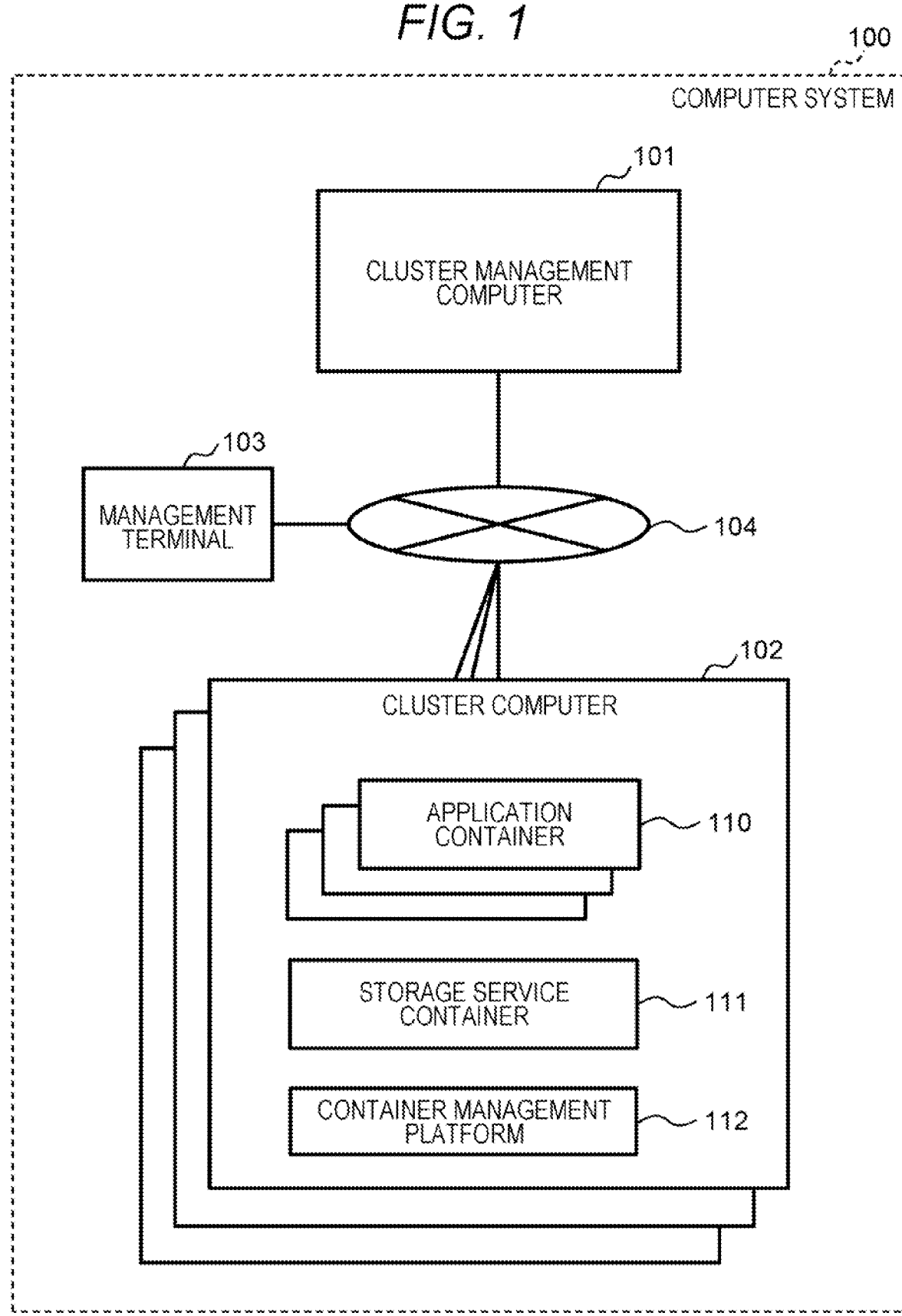
FIG. 1 is an overall configuration diagram of a computer system according to an embodiment.

First, a computer system 100 according to the embodiment of the present invention will be described. FIG. 1 is an overall configuration diagram of the computer system 100 according to the embodiment.

The computer system 100 includes a cluster management computer 101, one or more cluster computers 102, a management terminal 103, and a network 104 that connects these components.

One or more application containers 110, a storage service container 111, and a container management platform 112 run on the cluster computer 102. Services for the hyper-converged infrastructure are achieved by the computer system.

In the computer system 100 illustrated in FIG. 1, an example in which the cluster management computer 101 and the cluster computer 102 are separately provided is illustrated, but the cluster management computer 101 and the cluster computer 102 may be provided by using one bare metal (physical computer). For example, the cluster management computer 101 may be in the form of a virtual computer, or may be in the form of a container constructed by a container virtualization technology. The cluster management computer 101 may not necessarily be an independent device, and functions thereof may be included in any of the cluster computers 102.

The storage service container 111 is an example of a storage service instance that provides a volume service to the application container 110. The storage service container 111 of FIG. 1 is constituted by a single container that operates on a container platform that simulates an independent OS space, but may be in the form of a virtual computer (VM) that operates on a hypervisor that emulates the hardware of the physical computer, or may be in the form of a storage service that operates on a hypervisor of a bare metal or a host OS. The storage service container may be in the form that provides a storage service by a plurality of containers or a plurality of virtual computers.

The application container 110 is a container used by a user of the hyper converged infrastructure, and is an example of an application service instance. The application container 110 may be in the form of a virtual computer (VM), or may be in the form of an application that operates on a hypervisor of a bare metal or a host OS.

The container management platform 112 manages the application containers 110 and the storage service container 111. The container management platform 112 may be in the form of a virtual computer (VM) management platform or in the form of a bare metal management platform depending on an operation form of the storage service and the application.

Figure 2:
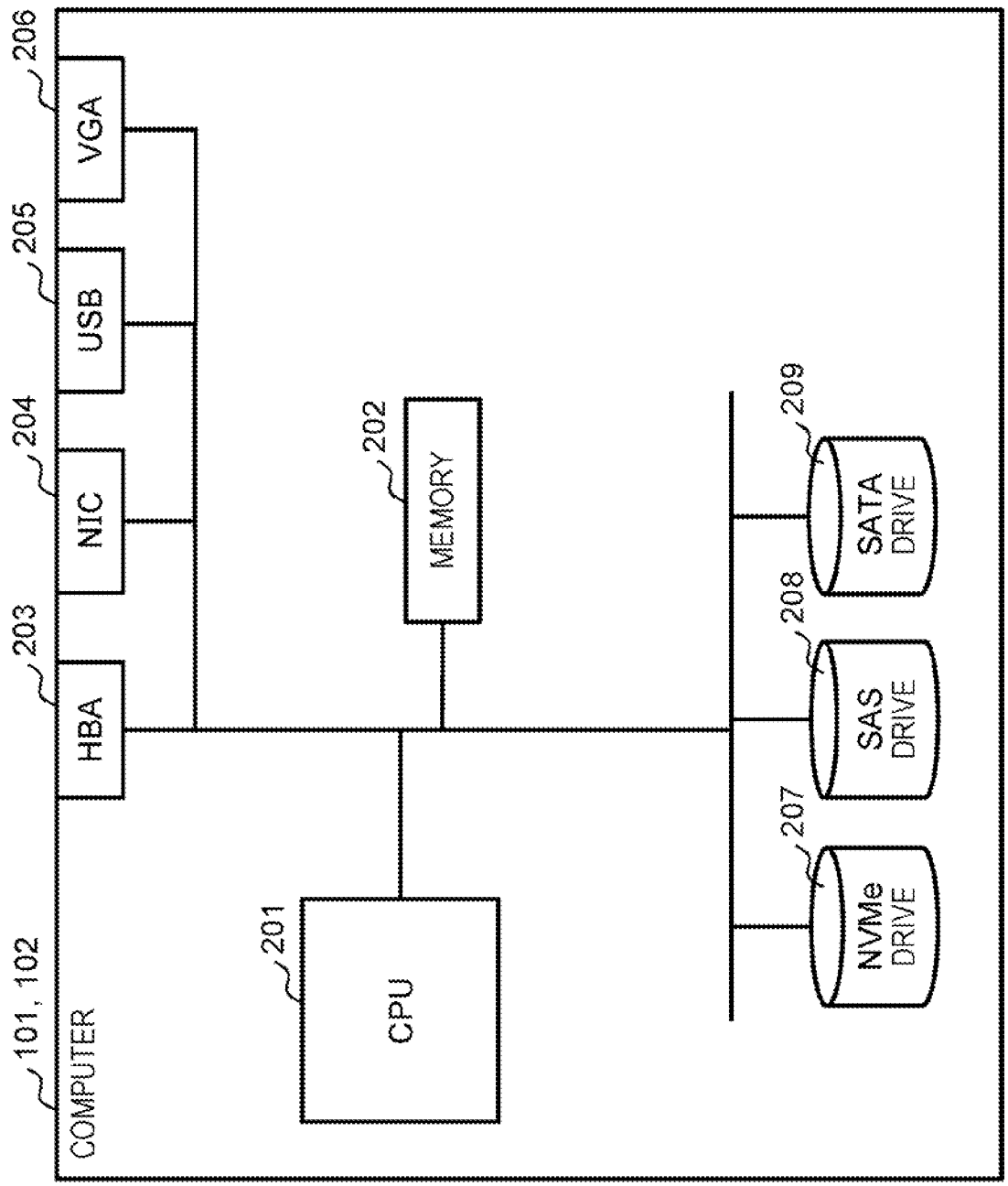
FIG. 2 is a hardware configuration diagram of a cluster computer or a cluster management computer according to the embodiment.

Next, a hardware configuration of the cluster management computer 101 and the cluster computer 102 will be described. FIG. 2 is a hardware configuration diagram of the cluster management computer 101 and the cluster computer 102 according to the embodiment. In the present embodiment, basic hardware configurations of the cluster management computer 101 and the cluster computer 102 are the same. Hereinafter, the cluster management computer 101 may be simply referred to as the computer 101, and the cluster computer 102 may be simply referred to as the computer 102.

The computer 101 (102) is constituted by a computer such as a PC or a server, and includes a central processing unit (CPU) 201 as an example of the processor unit, a memory 202, a host bus adapter (HBA) 203, a network interface card (NIC) 204, Universal Serial Bus (USB) 205, Video Graphics Array (VGA) 206, and a storage device. These components are connected by an internal bus or an external bus. The storage device includes, for example, a Non-Volatile Memory express (NVMe) drive 207, a Serial Attached SCSI (SAS) drive 208, a Serial ATA (SATA) drive 209, and an external drive (not illustrated) connected by the HBA 203.

Figure 3:
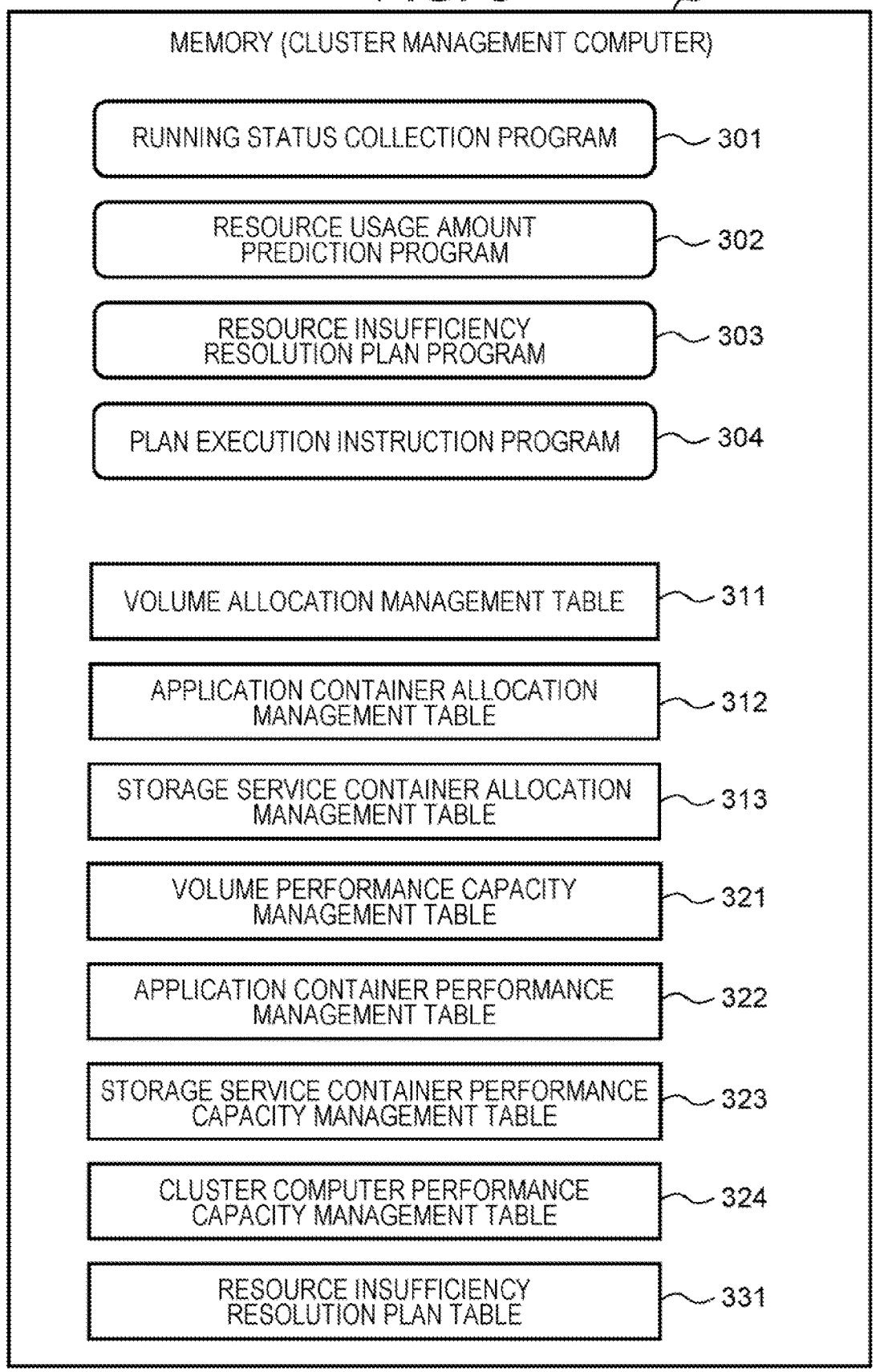
FIG. 3 is a configuration diagram of a memory of the cluster management computer according to the embodiment.

Next, a configuration of the memory 202 (202A) of the cluster management computer 101 will be described. FIG. 3 is a configuration diagram of the memory 202 (202A) of the cluster management computer according to the embodiment.

The memory 202 (202A) of the cluster management computer 101 stores a running status collection program 301, a resource usage amount prediction program 302, a resource insufficiency resolution plan program 303, and a plan execution instruction program 304. The memory 202A stores a volume allocation management table 311, an application container allocation management table 312, a storage service container allocation management table 313, a volume performance capacity management table 321, an application container performance management table 322, a storage service container performance capacity management table 323, a cluster computer performance capacity management table 324, and a resource insufficiency resolution plan table 331. The memory 202A stores programs and tables for achieving other cluster managements (not illustrated).

Figure 4:
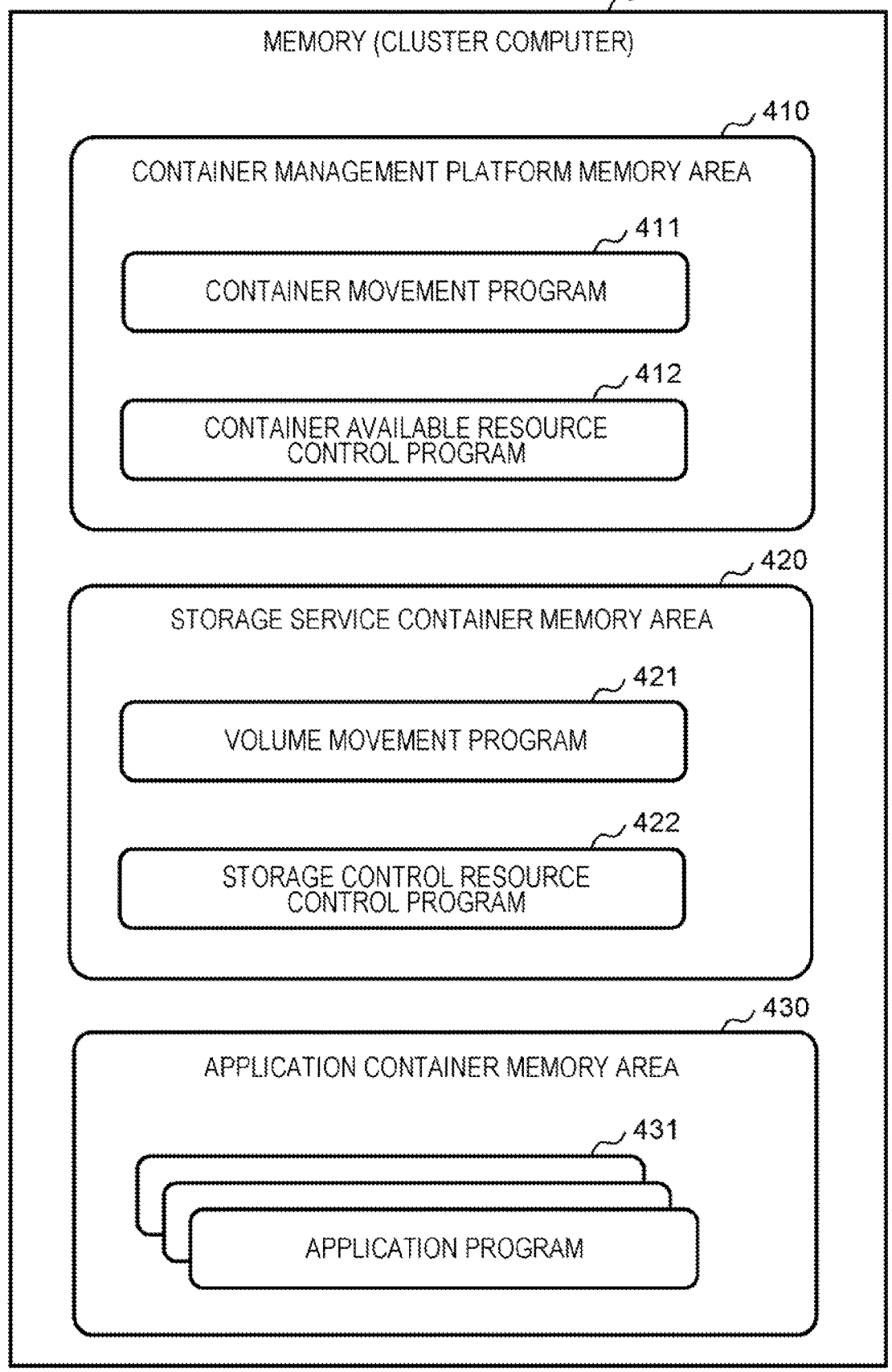
FIG. 4 is a configuration diagram of the memory of the cluster computer according to the embodiment.

Next, a configuration of the memory 202 (202B) of the cluster computer 102 will be described. FIG. 4 is a configuration diagram of the memory 202 (202B) of the cluster computer according to the embodiment. The memory 202 (202B) of the cluster computer 102 has a container management platform memory area 410, a storage service container memory area 420, and an application container memory area 430.

The container management platform memory area 410 stores a container movement program 411 and a container usable resource control program 412. The storage service container memory area 420 stores a volume movement program 421 and a storage control resource control program 422. The application container memory area 430 stores one or more application programs 431. The memory 202B stores programs and tables for achieving various other services required for the hyper converged infrastructure (not illustrated).

Figure 5:
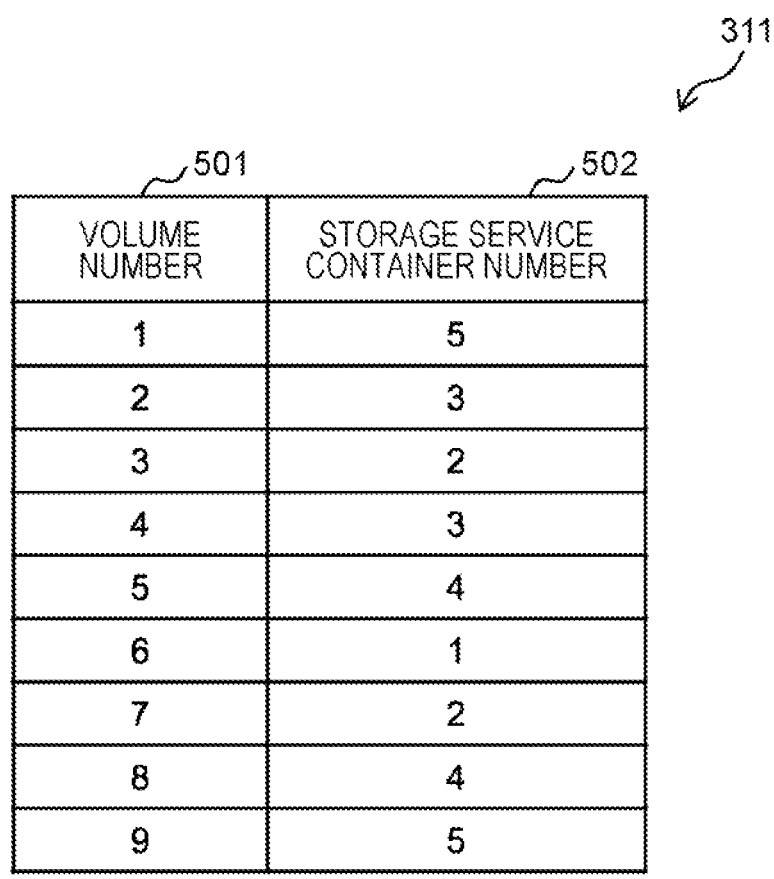
FIG. 5 is a configuration diagram of a volume allocation management table according to the embodiment.

Next, a configuration of the volume allocation management table 311 will be described. FIG. 5 is a configuration diagram of the volume allocation management table 311 according to the embodiment. The volume allocation management table 311 shows a volume provided to the application container and the storage service container that provides the volume. Here, the volume is constituted by areas of one or more storage devices and is provided from the storage service container 111 to the application container 110 by a storage protocol such as iSCSI, NFS, NVMe-oF, or SCSI.

The volume allocation management table 311 stores rows corresponding to the volumes. Each row contains, as columns, items of a volume number 501 and a storage service container number 502.

Information for specifying the volume is stored in the volume number 501. For example, a logical unit number (LUN) is stored. The storage service container number 502 stores information for specifying the storage service container that services the volume. For example, a serial number, an IP address, or the like are stored.

Figure 6:
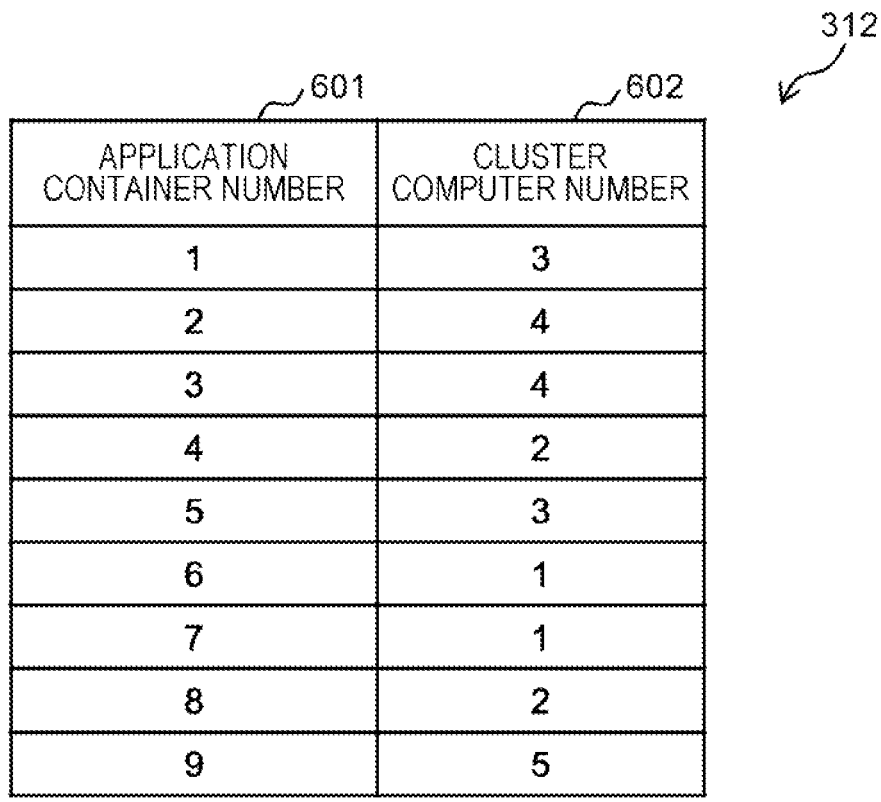
FIG. 6 is a configuration diagram of an application container allocation management table according to the embodiment.

Next, a configuration of the application container allocation management table 312 will be described. FIG. 6 is a configuration diagram of the application container allocation management table 312 according to the embodiment.

The application container allocation management table 312 stores rows corresponding to the application containers 110. Each row contains, as columns, items of an application container number 601 and a cluster computer number 602.

The information specified by the application container 110 is stored in the application container number 601. For example, a serial number, an IP address, or the like are stored. The cluster computer number 602 stores information for specifying the cluster computer 102 on which the application container runs. For example, a serial number, an IP address, or the like are stored.

Figure 7:
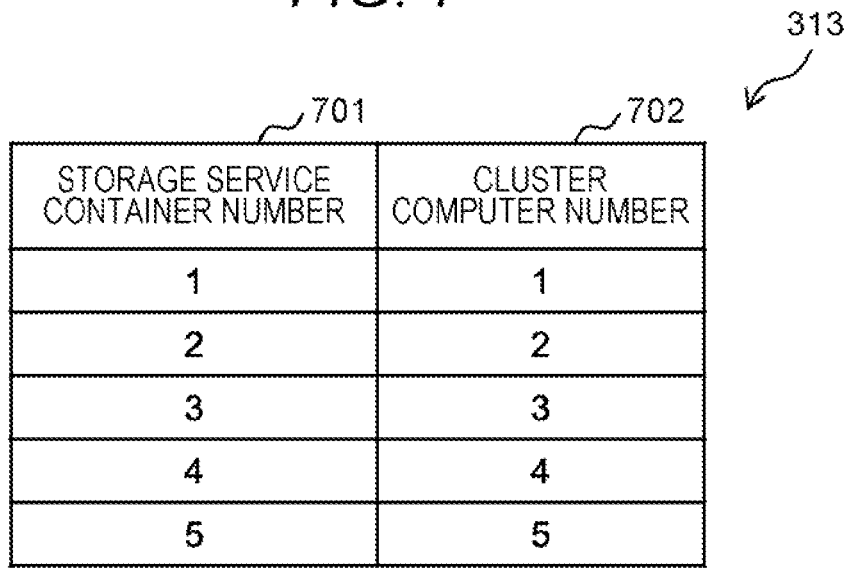
FIG. 7 is a configuration diagram of a storage service container allocation management table according to the embodiment.

Next, a configuration of the storage service container allocation management table 313 will be described. FIG. 7 is a configuration diagram of the storage service container allocation management table 313 according to the embodiment.

The storage service container allocation management table 313 stores rows corresponding to the storage service containers 111. Each row contains, as columns, items of a storage service container number 701 and a cluster computer number 702.

Information for specifying the storage service container 111 is stored in the storage service container number 701. For example, a serial number, an 1P address, or the like are stored. The cluster computer number 702 stores information for specifying the cluster computer 102 on which the storage service container 111 runs. For example, a serial number, an IP address, or the like are stored.

Figure 8:
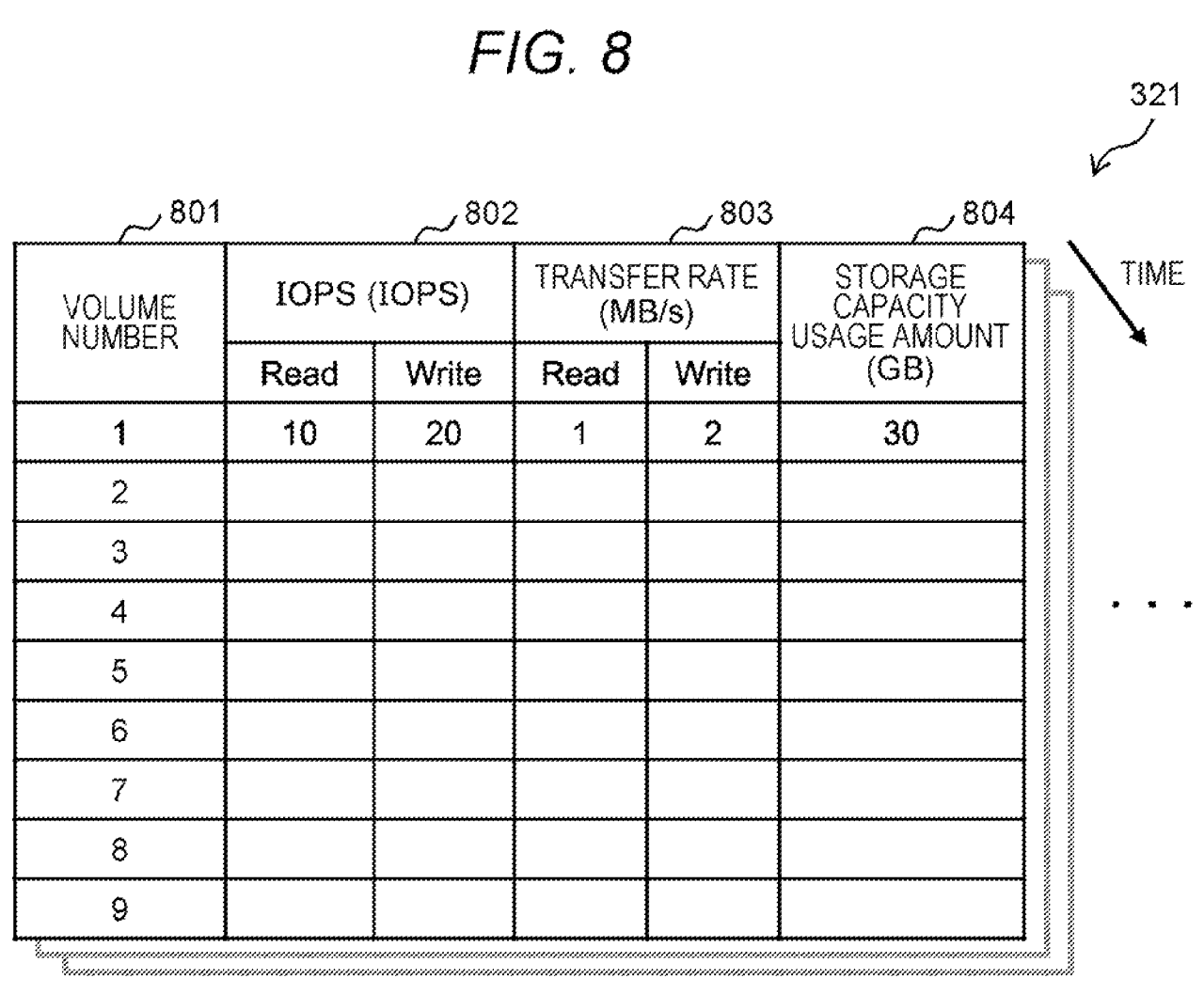

Next, a configuration of the volume performance capacity management table 321 will be described. FIG. 8 is a configuration diagram of the volume performance capacity management table 321.

The volume performance capacity management table 321 stores rows corresponding to the volumes. Each row contains, as columns, items of a volume number 801, an IOPS 802, a TransferRate 803, and a storage capacity usage amount 604.

Information for specifying the volume is stored in the volume number 801. In the IOPS 802, information on the number of IOs per unit time for the volume is stored in each of Read and Write. In the TransferRate 803, information on the amount of data transferred per unit time for the volume is stored in each of Read and Write. The storage capacity usage amount 804 stores the usage amount of a storage capacity for the volume. Since each usage amount changes with time, the IOPS 802, the TransferRate 803, and the storage capacity usage amount 804 are stored as new information at regular intervals.

Although an index of IO performance is stored here, the amount of CPU and the amount of memory with which the volume for the service is consumed in the storage service container 111 may be stored.

FIG. 9 is a configuration diagram of the application container performance management table 322 according to the embodiment.

The application container performance management table 322 stores rows corresponding to the application containers 110. Each row contains, as columns, items of an application container number 901, a CPU 902, a memory 903, and a network bandwidth 904.

Information for specifying the application container 110 is stored in the application container number 901. The CPU 902 stores the usage amount and definition amount of the CPU for the application container. Here, the definition amount of the CPU is a maximum value of the usage amount of the CPU usable by the application container 110.

The memory 903 stores the usage amount and definition amount of the memory for the application container 110. Here, the definition amount of the memory is a maximum value of the usage amount of the memory usable by the application container. The network bandwidth 904 stores the usage amount and definition amount of a network bandwidth for the application container 110. Here, the definition amount of the network bandwidth is a maximum value of the network bandwidth usable by the application container 110. Transmission and reception information is stored in the network bandwidth 904.

Since each usage amount changes with time, the usage amount of the CPU 902, the usage amount of the memory 903, and the usage amount of transmission and reception of the network bandwidth 904 are stored as new information at regular intervals.

FIG. 10 is a configuration diagram of the storage service container performance capacity management table 323 according to the embodiment. The storage service container performance capacity management table 323 stores rows corresponding to the storage service containers 111. Each row contains, as columns, items of a storage service container number 1001, a CPU 1002, a memory 1003, a network bandwidth 1004, and a storage capacity 1005.

Information for specifying the storage service container 111 is stored in the storage service container number 1001. The CPU 1002 stores the usage amount and definition amount of the CPU for the storage service container 111. Here, the definition amount of the CPU is a maximum value of the usage amount of the CPU usable by the storage service container.

The memory 1003 stores the usage amount and definition amount of the memory for the storage service container 111. Here, the definition amount of the memory is a maximum value of the usage amount of the memory usable by the storage service container 111. The network bandwidth 1004 stores the usage amount and definition amount of the network bandwidth for the storage service container 111. Here, the definition amount of the network bandwidth is a maximum value of the network bandwidth usable by the storage service container 111.

Transmission and reception information is stored in the network bandwidth 1004. The storage capacity 1005 stores the usage amount and definition amount of the storage capacity for the storage service container 111. Here, the definition amount of the storage capacity is a maximum value of the storage capacity usable by the storage service container.

Since each usage amount changes with time, the usage amount of the CPU 1002, the usage amount of the memory 1003, the usage amount of transmission and reception of the network bandwidth 1004, and the storage capacity 1005 are stored as new information at regular intervals.

FIG. 11 is a configuration diagram of the cluster computer performance capacity management table 324 according to the embodiment. The cluster computer performance capacity management table 324 stores rows corresponding to the cluster computers 102. Each row contains, as columns, items of a cluster computer number 1101, a CPU 1102, a memory 1103, a network bandwidth 1104, and a storage capacity 1105.

Information for specifying the cluster computer 102 is stored in the cluster computer number 1101. The CPU 1102 stores the usage amount and definition amount of the CPU for the cluster computer. Here, the definition amount of the CPU is a maximum value of the usage amount of the CPU usable by the cluster computer 102. The memory 1103 stores the usage amount and definition amount of the memory for the cluster computer 102. Here, the definition amount of the memory is a maximum value of the usage amount of the memory usable by the cluster computer.

The network bandwidth 1104 stores the usage amount and definition amount of the network bandwidth for the cluster computer 102. Here, the definition amount of the network bandwidth is a maximum value of the network bandwidth usable by the cluster computer. Transmission and reception information is stored in the network bandwidth 1104. The storage capacity 1105 stores the usage amount and definition amount of the storage capacity for the cluster computer. Here, the definition amount of the storage capacity is a maximum value of the storage capacity usable by the cluster computer.

Since each usage amount changes with time, the usage amount of the CPU 1102, the usage amount of the memory 1103, the usage amount of transmission and reception of the network bandwidth 1104, and a storage capacity 1105 are stored as new information at regular intervals.

FIG. 12 is a configuration diagram of the resource insufficiency resolution plan table 331 according to the embodiment. The resource insufficiency resolution plan table 331 stores rows corresponding to resource insufficiency resolution plans. Each row contains, as columns, items of a plan management number 1201, a target object type 1202, an object number 1203, an action type 1204, and an action content 1205.

Information for specifying the resource insufficiency resolution plan is stored in the plan management number 1201. The target object type 1202 stores information regarding a type of a target object of the resource insufficiency resolution plan. Examples of the target object include the storage service container, the volume, and the application container.

The object number 1203 stores a number for specifying the target object. The action type 1204 stores information on a type of an action planned for the target object. The action content 1205 stores a planned content of the action for the target object.

For example, plan management number 1 is a plan to add 20 GHz to the definition amount of the CPU of the second storage service container. Plan management number 2 is a plan to move the third volume to the second storage service container. Plan management number 3 is a plan to move the second application container to the second cluster computer.

Next, a processing operation of the computer system 100 according to the present embodiment will be described.

First, running status collection processing will be described.

Figure 13:
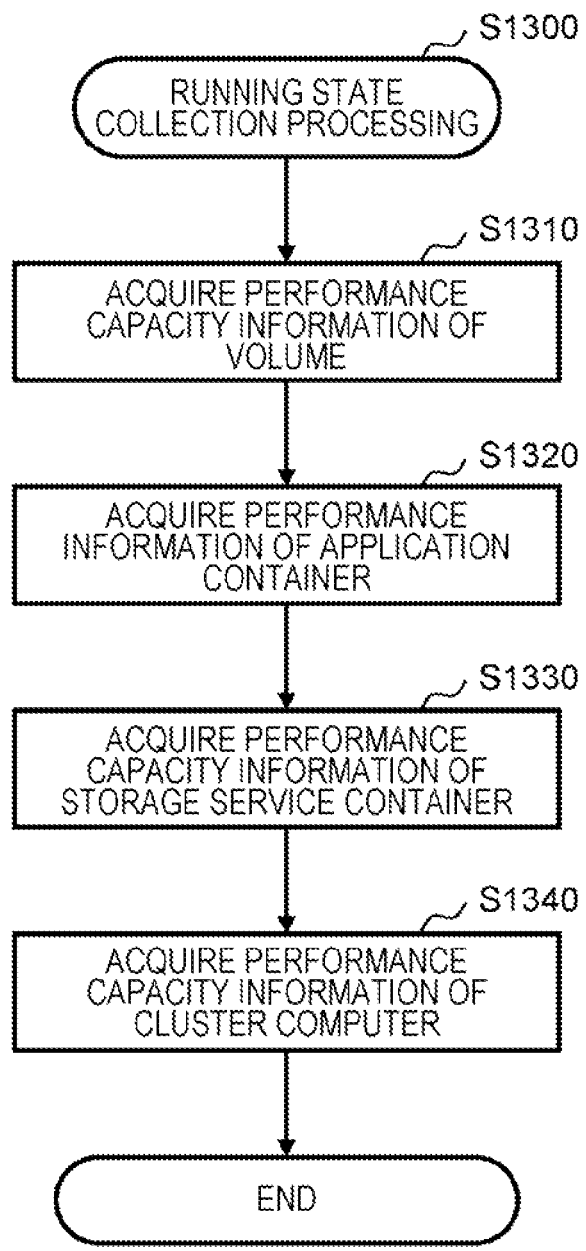
FIG. 13 is a flowchart of running status collection processing according to the embodiment.

FIG. 13 is a flowchart of running status collection processing 31300 according to the embodiment. The running status collection processing S1300 is executed by the running status collection program 301 of the cluster management computer 101. The running status collection program 301 is executed by an administrator via the management terminal 103 or the like.

First, the running status collection program 301 acquires performance capacity information of the volume from the volume performance capacity management table 321 (S1310).

Next, the running status collection program 301 acquires performance information of the application container from the application container performance management table 322 (S1320).

Subsequently, the running status collection program 301 acquires performance capacity information of the storage service container from the storage service container performance capacity management table 323 (31330).

Subsequently, the running status collection program 301 acquires performance capacity information of the cluster computer from the cluster computer performance capacity management table 324 (S1340), and ends the running status collection processing.

Various tables used in this flowchart already store time-series performance capacity information by another program.

Next, resource usage amount prediction processing S1400 will be described.

Figure 14:
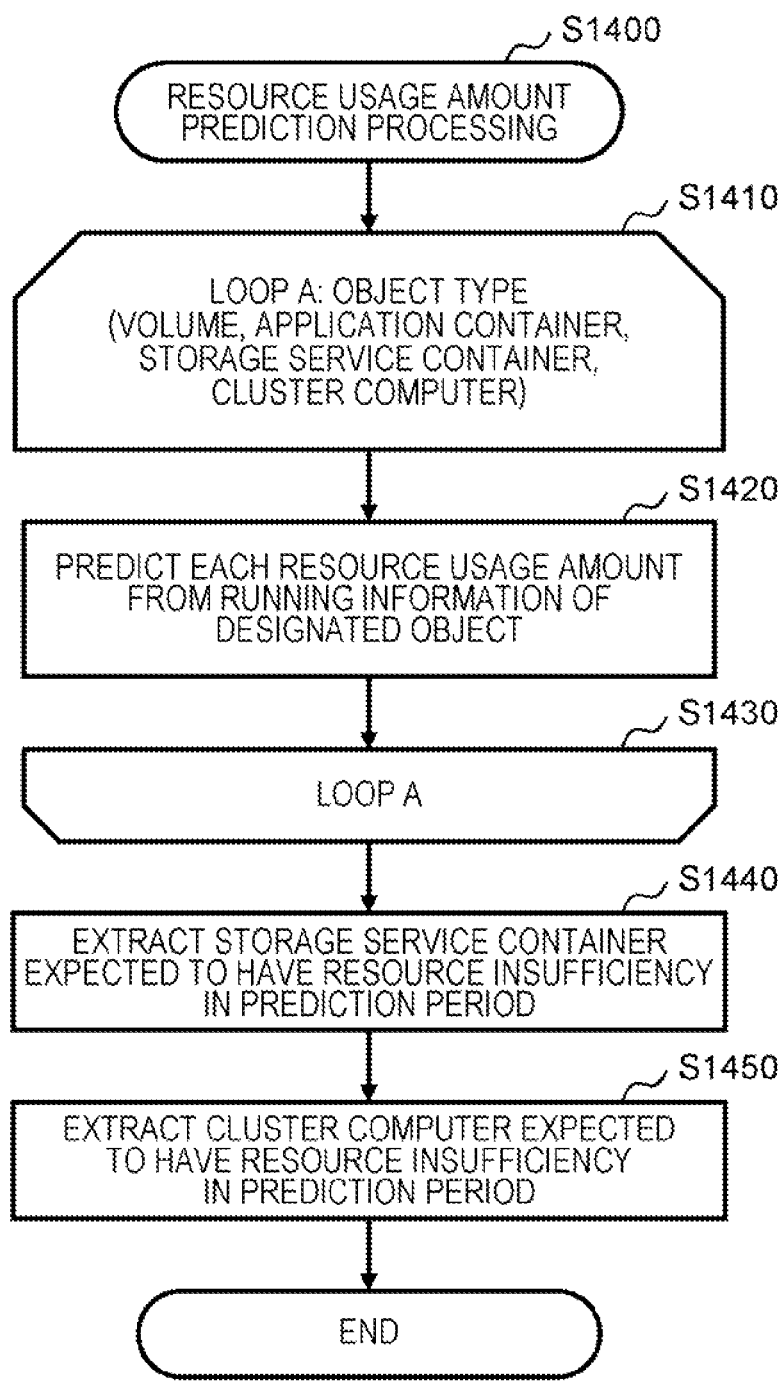
FIG. 14 is a flowchart of resource usage amount prediction processing according to the embodiment.

FIG. 14 is a flowchart of the resource usage amount prediction processing S1400 according to the embodiment. The resource usage amount prediction processing S1400 is executed by the resource usage amount prediction program 302 of the cluster management computer 101. The resource usage amount prediction program 302 is executed by the administrator via the management terminal 103 or the like.

In the resource usage amount prediction processing S1400, the resource usage amount prediction program 302 first starts a loop for the object type (S1410). Here, there are four types of objects of the volume, the application container, the storage service container, and the cluster computer.

Subsequently, the resource usage amount prediction program 302 predicts each resource usage amount from running information of the object designated in S1410 (S1420). Here, each resource usage amount is the CPU, the memory, the network bandwidth, and the storage capacity. When the volume performance capacity management table 321 is stored in the format of the IOPS and the TransferRate, the predicted data is converted into the format of the CPU, the memory, and the network bandwidth.

The resource usage amount prediction program 302 performs the processing for all object types and ends the loop processing (51430).

Subsequently, the resource usage amount prediction program 302 extracts the storage service container 111 expected to have a resource insufficiency in terms of the CPU, the memory, the network bandwidth, and the storage capacity within a prediction period (S1440).

Subsequently, the resource usage amount prediction program 302 extracts the cluster computer 102 expected to have a resource insufficiency in terms of the CPU, the memory, the network bandwidth, and the storage capacity within a prediction period (S1450), and ends the resource usage amount prediction processing S1400.

Next, resource insufficiency resolution plan processing S1500 will be described.

Figure 15:
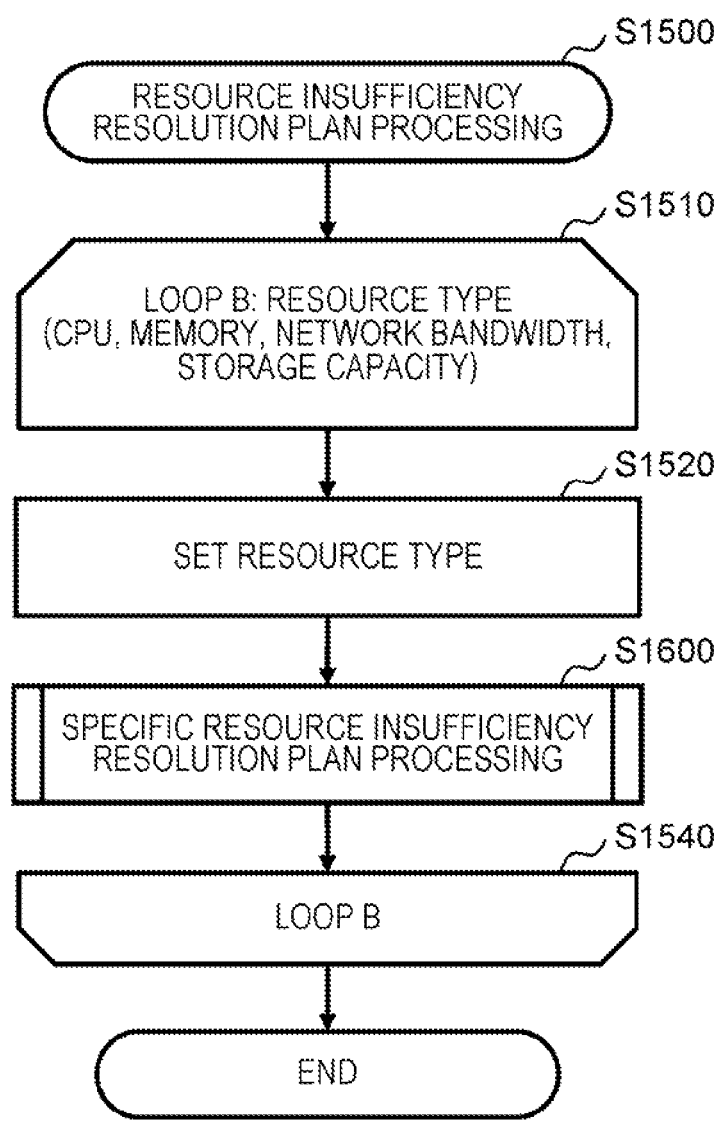
FIG. 15 is a flowchart of resource insufficiency resolution plan processing according to the embodiment.

FIG. 15 is a flowchart of the resource insufficiency resolution plan processing S1500 according to the embodiment. The resource insufficiency resolution plan processing S1500 is executed by the resource insufficiency resolution plan program 303 of the cluster management computer 101. The resource insufficiency resolution plan program 303 is executed by the administrator via the management terminal 103 or the like.

In the resource insufficiency resolution plan processing S1500, the resource insufficiency resolution plan program 303 first starts a loop for the resource type (S1510). Here, there are four types of resources of the CPU, the memory, the network bandwidth, and the storage capacity.

Subsequently, the resource insufficiency resolution plan program 303 sets the resource designated in S1510 (S1520), and calls specific resource insufficiency resolution plan processing (S1600). Details of the specific resource insufficiency resolution plan processing 31510 will be described later.

The resource insufficiency resolution plan program 303 performs the processing for all the resource types, and ends the loop processing (S1540). With this, the resource insufficiency resolution plan processing 31500 is ended.

Next, the specific resource insufficiency resolution plan processing 31600 will be described.

Figure 16:
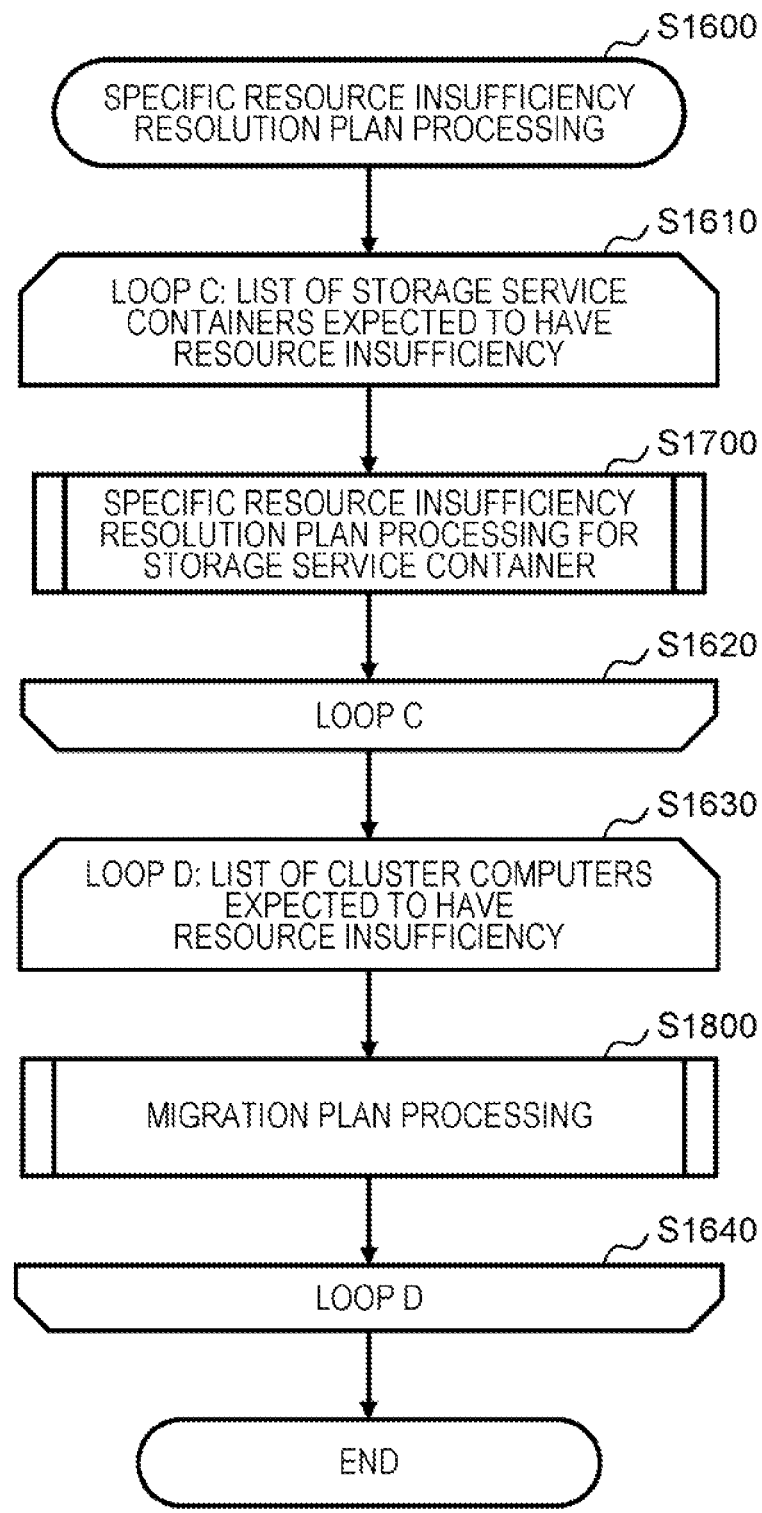
FIG. 16 is a flowchart of specific resource insufficiency resolution plan processing according to the embodiment.

FIG. 16 is a flowchart of the specific resource insufficiency resolution plan processing 31600 according to the embodiment. The specific resource insufficiency resolution plan processing 31600 is executed by being called from the resource insufficiency resolution plan processing (S1500) executed by the resource insufficiency resolution plan program 303 of the cluster management computer 101. The resource insufficiency resolution plan program 303 is executed by the administrator via the management terminal 103 or the like.

In the specific resource insufficiency resolution plan processing, the resource insufficiency resolution plan program 303 first starts a loop in a list of the storage service containers 111 expected to have a resource insufficiency, which are obtained in the resource usage amount prediction processing (S1400) (S1610).

Subsequently, the resource insufficiency resolution plan program 303 calls the specific resource insufficiency resolution plan processing for the storage service container for the resource designated and the storage service container 111 designated in S1610 (S1700). Details of the specific resource insufficiency resolution plan processing S1700 for the storage service container will be described later.

The resource insufficiency resolution plan program 303 performs the processing for all the storage service containers expected to have a resource insufficiency, and ends the loop processing (S1620).

Subsequently, the resource insufficiency resolution plan program 303 starts a loop in a list of the cluster computers 102 expected to have a resource insufficiency which are obtained in the resource usage amount prediction processing (S1450) (S1630).

Subsequently, the resource insufficiency resolution plan program 303 calls migration plan processing for the resource and the cluster computer 102 designated in S1630 (S1800). Details of the migration plan processing S1800 will be described later.

The resource insufficiency resolution plan program 303 performs the processing for all the cluster computers expected to have a resource insufficiency, and ends the loop processing (S1640). With this, the specific resource insufficiency resolution plan processing S1600 is ended.

Next, the specific resource insufficiency resolution plan processing S1700 for the storage service container will be described.

Figure 17:
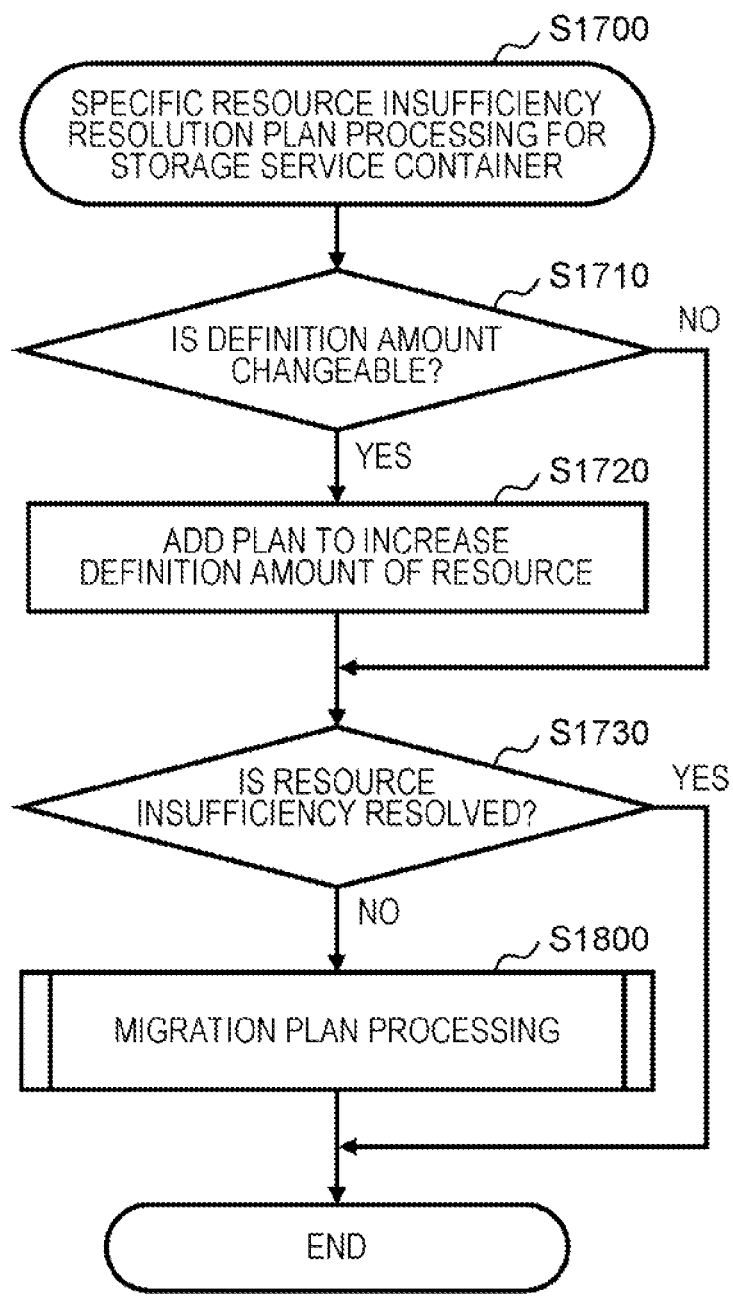
FIG. 17 is a flowchart of storage service container specific resource insufficiency resolution plan processing according to the embodiment.

FIG. 17 is a flowchart of the specific resource insufficiency resolution plan processing S1700 for the storage service container. The specific resource insufficiency resolution plan processing S1700 for the storage service container is executed by being called from the specific resource insufficiency resolution plan processing (S1600) executed by the resource insufficiency resolution plan program 303 of the cluster management computer 101. The resource insufficiency resolution plan program 303 is executed by the administrator via the management terminal 103 or the like.

In the specific resource insufficiency resolution plan processing S1700 for the storage service container, the resource insufficiency resolution plan program 303 first confirms whether the definition amount of designated resource is changeable (S1710). A case where the definition amount of resource is changeable, for example, is a case where the amount of available resource of the running containers is changeable and a case where the number of running containers is changeable. The case of the virtual computer (VM) that achieves the storage service is a case where the amount of available resource of the running virtual computers is changeable and a case where the number of running virtual computers is changeable. The case of the bare metal that achieves the storage service is a case where the amount of available resource of processes of the running service is changeable and a case where the number of processes of the running service is changeable.

When the definition amount is changeable (S1710: Yes), the resource insufficiency resolution plan program 303 adds a plan to increase the definition amount of designated resource (S1720). When the definition amount is not changeable (S1710: No), the processing of S1720 is skipped.

Subsequently, the resource insufficiency resolution plan program 303 confirms whether the resource insufficiency is expected to be resolved by the processing so far (S1730). When the resource insufficiency is expected to be resolved (S1730: Yes), the resource insufficiency resolution plan program 303 ends the specific resource insufficiency resolution plan processing for the storage service container. When the resource insufficiency is not expected to be resolved (S1730: No), the resource insufficiency resolution plan program 303 calls the migration plan processing (S1800). The details of the migration plan processing will be described later. With this, the specific resource insufficiency resolution plan processing for the storage service container is ended.

Next, the migration plan processing S1800 will be described.

Figure 18:
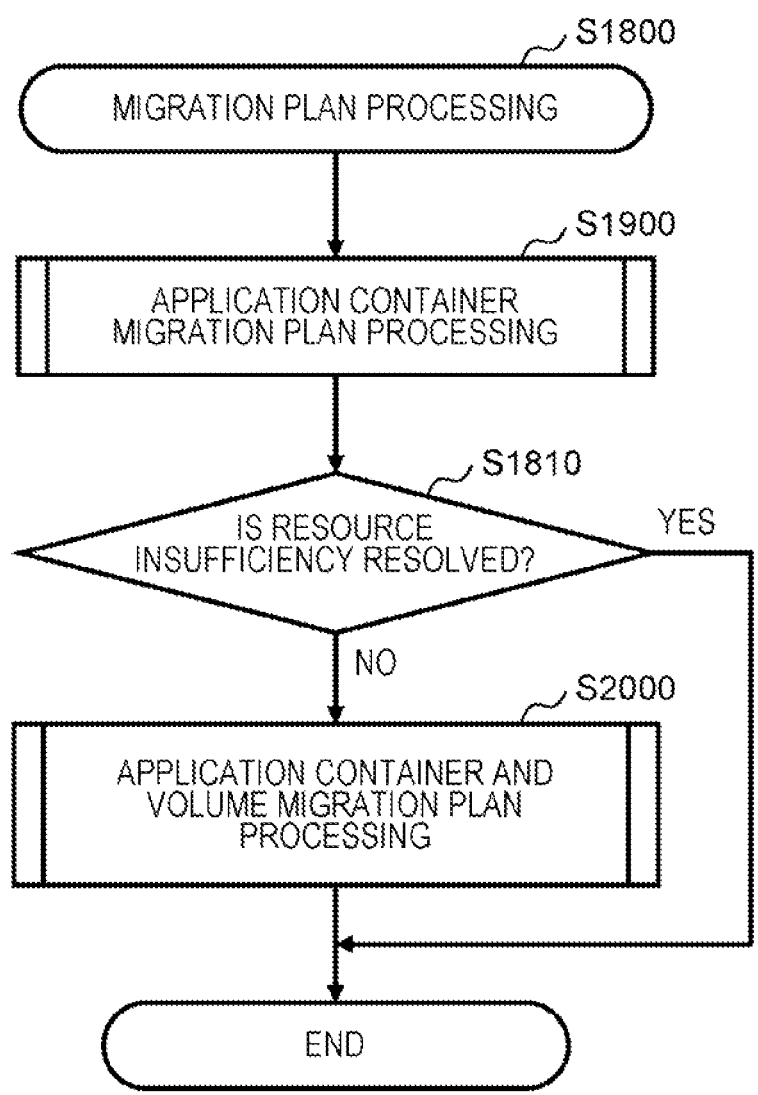
FIG. 18 is a flowchart of migration plan processing according to the embodiment.

FIG. 18 is a flowchart of the migration plan processing S1800. The migration plan processing S1800 is executed by being called from the specific resource insufficiency resolution plan processing (S1600) executed by the resource insufficiency resolution plan program 303 of the cluster management computer 101 or the specific resource insufficiency resolution plan processing (S1700) for the storage service container. The resource insufficiency resolution plan program 303 is executed by the administrator via the management terminal 103 or the like.

In the migration plan processing S1800, the resource insufficiency resolution plan program 303 first calls application container migration plan processing (S1900). Details of the application container migration plan processing S1900 will be described later.

Subsequently, the resource insufficiency resolution plan program 303 confirms whether the resource insufficiency is expected to be resolved by the processing so far (S1810). When the resource insufficiency is expected to be resolved (S1810: Yes), the migration plan processing S1800 is ended. When the resource insufficiency is not expected to be resolved (31810: No), application container and volume migration plan processing is called (S2000). Details of the application container and volume migration plan processing S2000 will be described later. With this, the resource insufficiency resolution plan program 303 ends the migration plan processing S1800.

Figure 19:
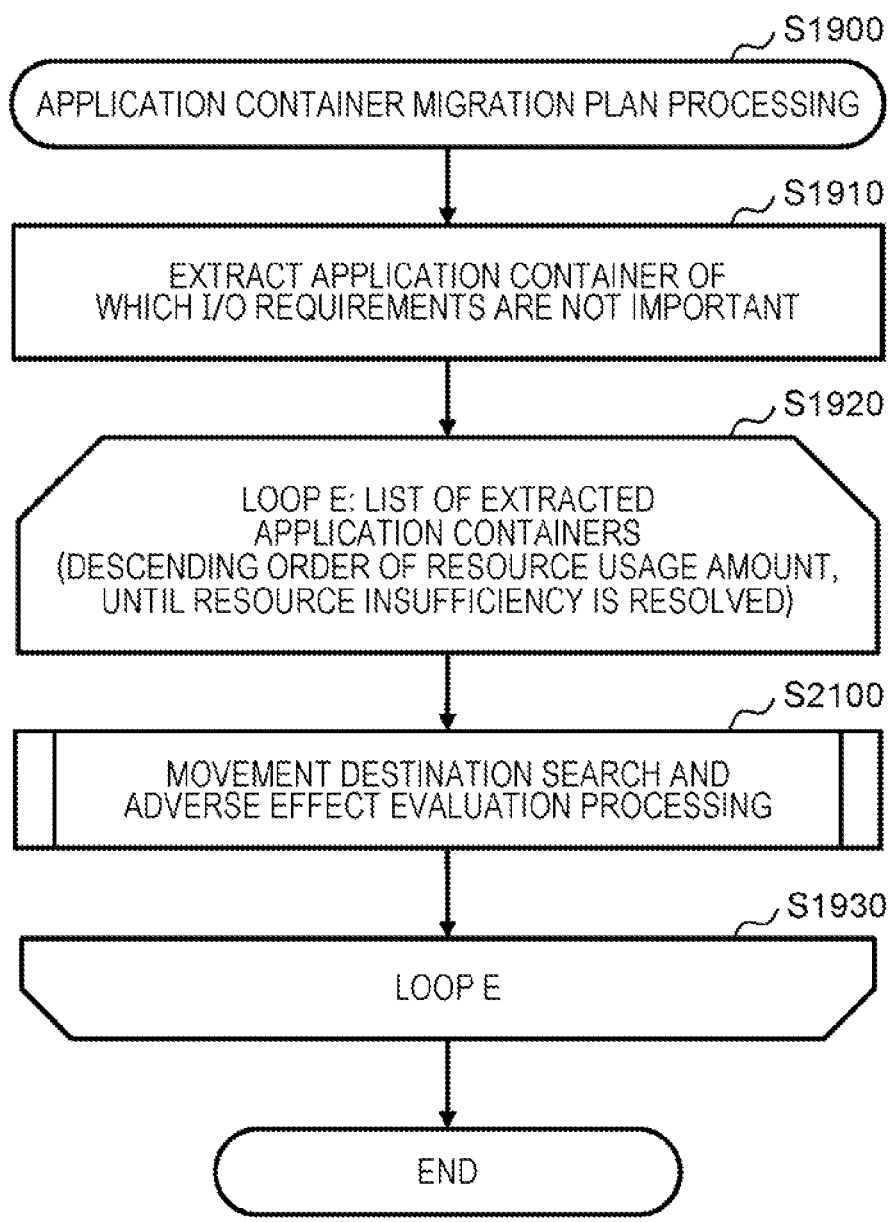
FIG. 19 is a flowchart of application container migration plan processing according to the embodiment.

Next, the application container migration plan processing S1900 will be described. FIG. 19 is a flowchart of the application container migration plan processing S1900. The application container migration plan processing S1900 is executed by being called from the migration plan processing (S1800) executed by the resource insufficiency resolution plan program 303 of the cluster management computer 101.

First, the resource insufficiency resolution plan program 303 extracts the application container 110 in which I/O requirements are not important (S1910). Here, examples of a condition in which the I/O requirements are not important includes a condition in which the IOPS of the volume used by the application container 110 is equal to or less than a certain value, a condition in which the TransferRate of the volume used by the application container 110 is equal to or less than a certain value, and a condition in which the I/O requirements are not designated as being important. These conditions may be logical conjunction (AND) or logical disjunction (OR).

Subsequently, the resource insufficiency resolution plan program 303 starts loop processing in descending order of the resource usage amount of resource designated from the calling source by using the list of the application containers 110 extracted in S1910 (S1920). The resource insufficiency resolution plan program 303 calls move destination search and adverse effect evaluation processing (S2100) for a target application container 110 extracted in S1910 in the loop processing. The details of the movement destination search and adverse effect evaluation processing S2100 will be described later.

The resource insufficiency resolution plan program 303 ends the loop processing under a condition that the movement destination search and adverse effect evaluation processing S2100 is to be performed for all the application containers 110 extracted in S1910 or the resource insufficiency is to be resolved (S1930). With this, the resource insufficiency resolution plan program 303 ends the application container migration plan processing S1900.

Figure 20:
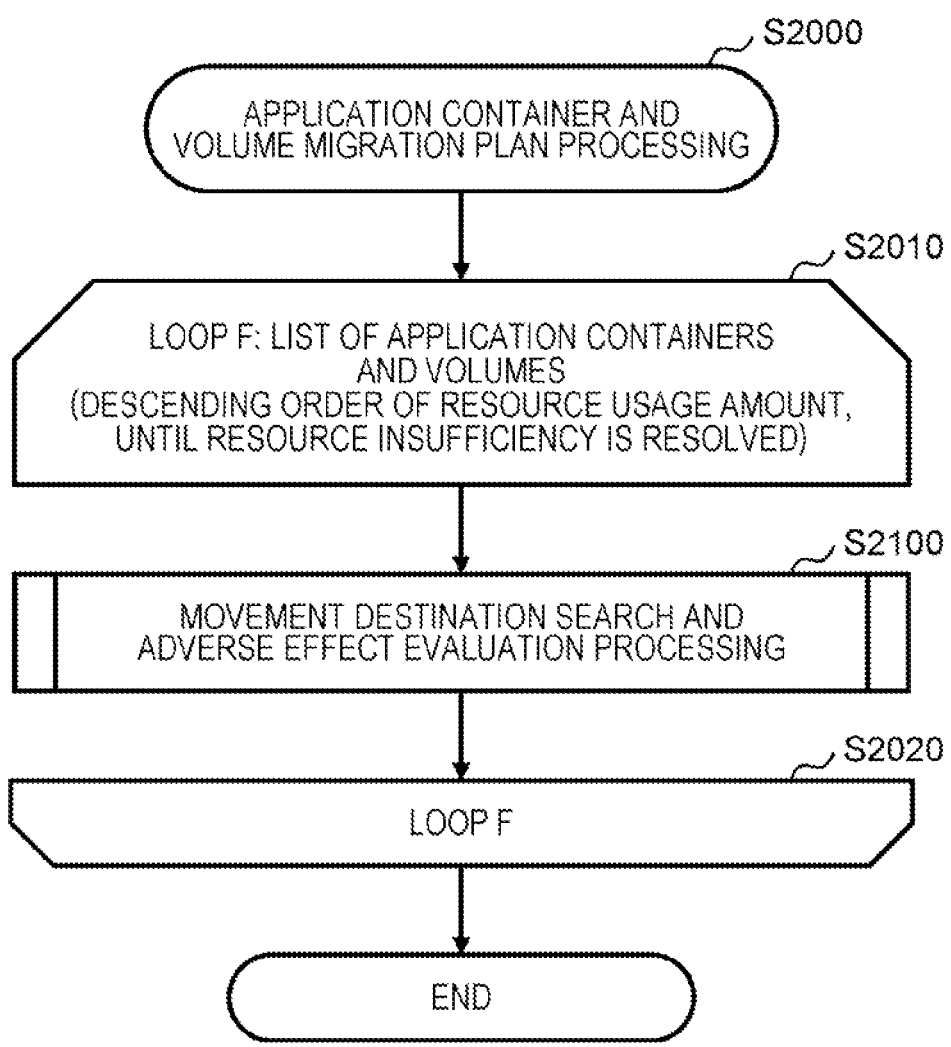
FIG. 20 is a flowchart of application container and volume migration plan processing according to the embodiment.

Next, the application container and volume migration plan processing S2000 will be described. FIG. 20 is a flowchart of the application container and volume migration plan processing S2000.

The application container and volume migration plan processing S2000 is executed by being called from the migration plan processing (S1800) executed by the resource insufficiency resolution plan program 303 of the cluster management computer 101.

First, the resource insufficiency resolution plan program 303 starts a loop in descending order of the resource usage amount of resource designated by the calling source by using the application container 110 and a list of groups of the volumes used by the application container 110 (S2010). The resource insufficiency resolution plan program 303 calls the movement destination search and adverse effect evaluation processing (S2100) for the target application container 110 and the target group of the volumes. The details of the movement destination search and adverse effect evaluation processing will be described later.

The resource insufficiency resolution plan program 303 ends the loop processing in the condition in which the processing is performed for all the target application containers 110 and the target groups of the volumes or the resource insufficiency is resolved (S2020). With this, the resource insufficiency resolution plan program 303 ends the application container and volume migration plan processing S2000.

Figure 21:
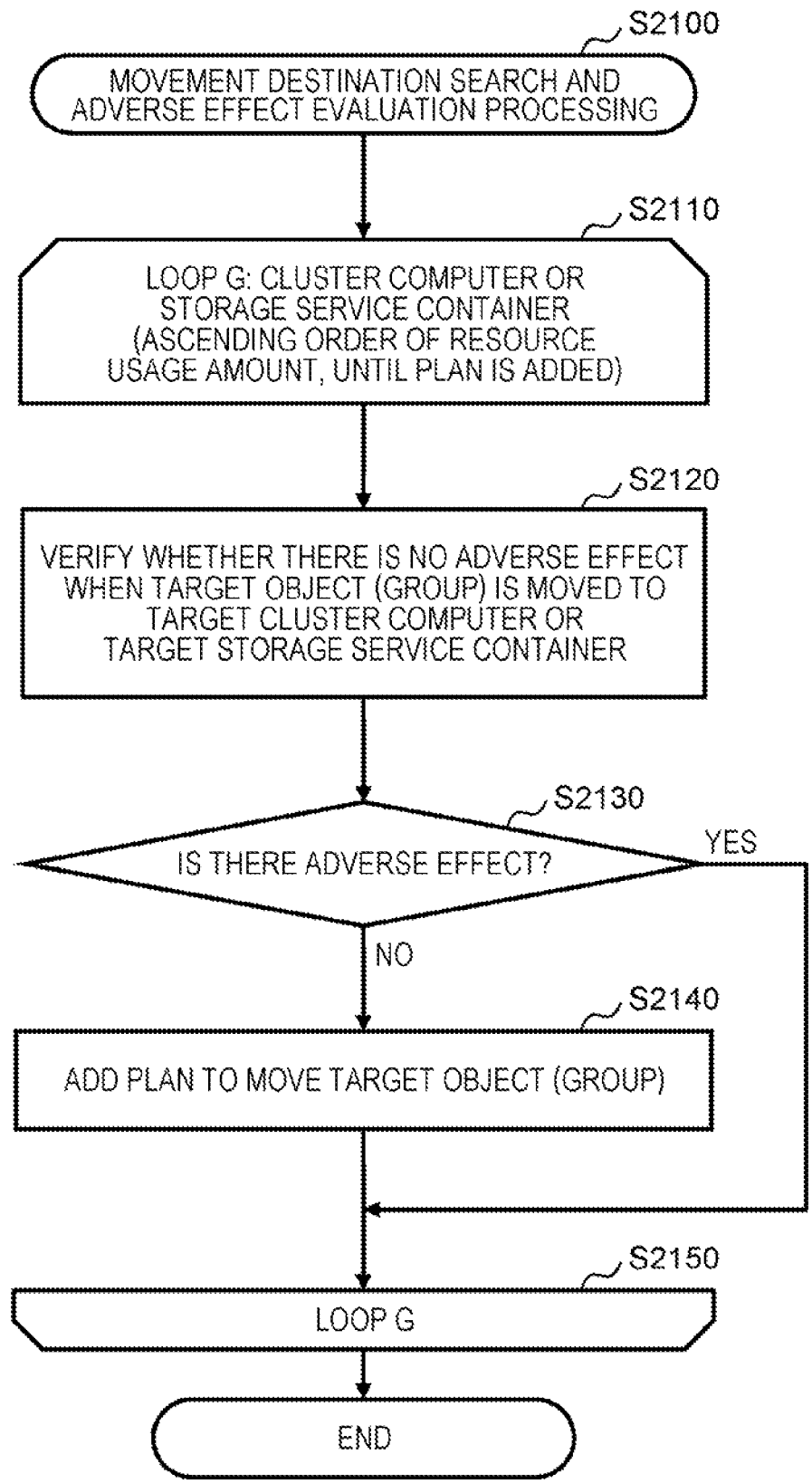
FIG. 21 is a flowchart of movement destination search and adverse effect evaluation processing according to the embodiment.

Next, the movement destination search and adverse effect evaluation processing S2100 will be described. FIG. 21 is a flowchart of the movement destination search and adverse effect evaluation processing S2100. The movement destination search and adverse effect evaluation processing S2100 is executed by being called from the application container migration plan processing (S1900) and the application container and volume migration plan processing (S2000) executed by the resource insufficiency resolution plan program 303 of the cluster management computer 101.

First, the resource insufficiency resolution plan program 303 starts a loop in descending order of the resource usage amount of resource designated by the calling source by using the list (S2110). The list used in S2110 is a list of the cluster computers 102 when a target of the movement destination is the cluster computer 102, and is a list of the storage service containers 111 when the target of the movement destination is the storage service container 111.

Subsequently, the resource insufficiency resolution plan program 303 verifies whether there is no adverse effect when the target object (group) is moved to the target cluster computer 102 or the storage service container 111 (32120). Here, the target object (group) is the application container 110 when it is called from the application container migration plan processing (S1900), and is the group of the application container and volume when it is called from the application container and volume migration plan processing (S2000).

The adverse effect is to verify whether the movement destination does not have the resource insufficiency when the target object (group) is moved to the target cluster computer 102 or the storage service container 111 (S2120). All the resource types (CPU, memory, network bandwidth, and storage capacity) are verified in addition to the resource insufficiency to be resolved (for example, CPU).

When there is no adverse effect or when the adverse effect is at an allowable level (S2130: No), the resource insufficiency resolution plan program 303 adds a plan for moving the target object (group) to the target cluster computer 102 or the target storage service container 111 to the resource insufficiency resolution plan table 331 (S2140).

When there is the adverse effect or when the adverse effect is not at the allowable level (S2130: Yes), the resource insufficiency resolution plan program 303 skips the plan addition processing (S2140) and shifts the loop processing to processing using the next cluster computer 102 or storage service container 111 as the target.

The resource insufficiency resolution plan program 303 ends the loop processing in the condition in which the loop processing is performed for all the cluster computers 102 or the storage service containers 111 or the plan is added by executing S2140 (S2150). With this, the resource insufficiency resolution plan program 303 ends the movement destination search and adverse effect evaluation processing.

Figure 22:
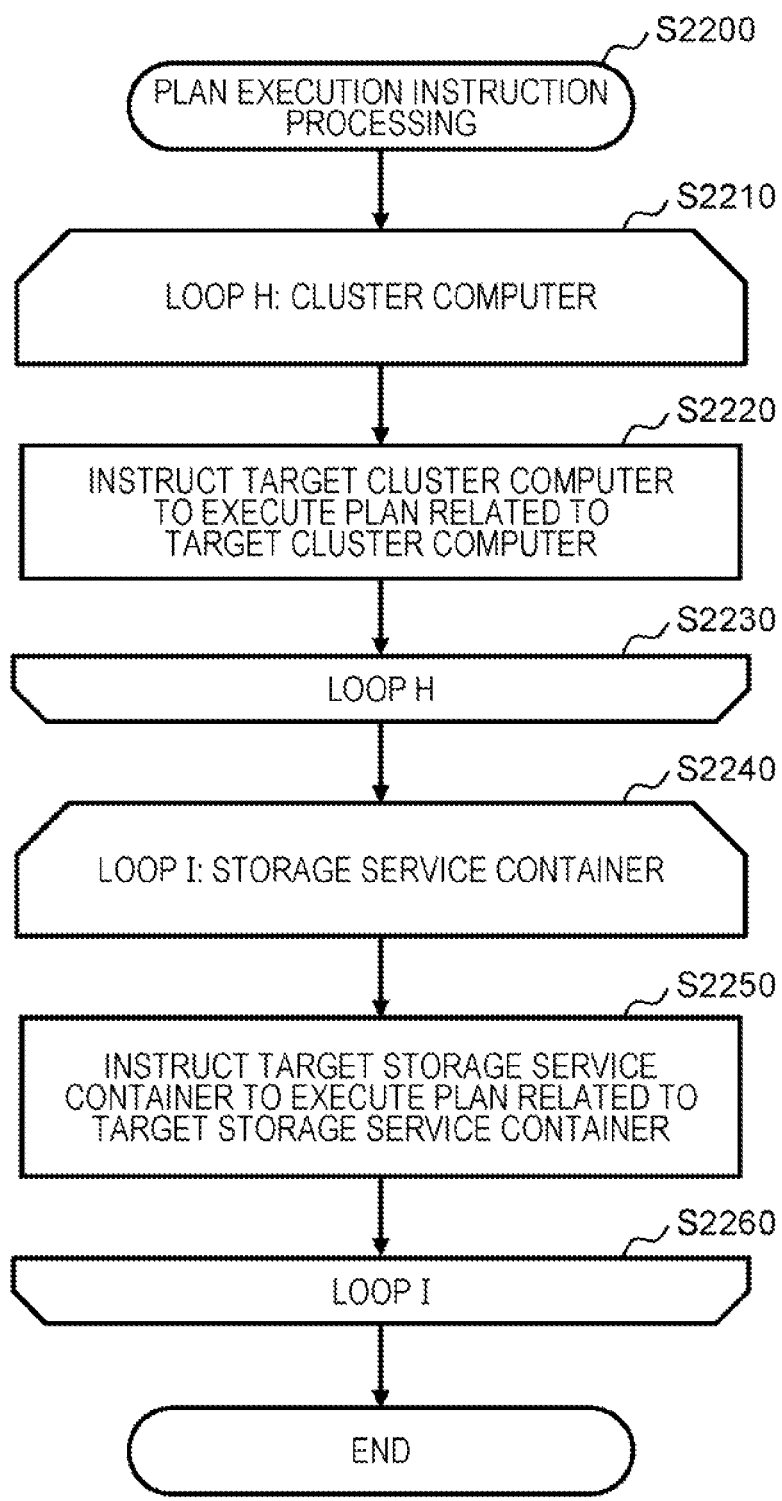
FIG. 22 is a flowchart of plan execution instruction processing according to the embodiment.

Next, plan execution instruction processing S2200 will be described. FIG. 22 is a flowchart of the plan execution instruction processing S2200. The plan execution instruction processing S2200 is executed by the plan execution instruction program 304 of the cluster management computer 101.

The plan execution instruction program 304 is executed by the administrator via the management terminal 103 or the like.

First, the plan execution instruction program 304 starts loop processing by using the list of the cluster computers 102 (S2210).

Subsequently, the plan execution instruction program 304 instructs the target cluster computer 102 to execute a plan related to the target cluster computer 102 (S2220). In the case of a plan to move the application container 110, the plan execution instruction program 304 calls the container movement program 411 of the target cluster computer 102. Accordingly, the application container 110 designated in the plan is moved to the cluster computer 102 designated in the plan. In the case of a plan to increase the definition amount of resource of the storage service container 111, the plan execution instruction program 304 calls the container usable resource control program 412 of the target cluster computer 102. Accordingly, the definition amount of resource of the storage service container 111 designated in the plan is increased.

The plan execution instruction program 304 performs the processing of S2220 for all the cluster computers 102, and ends the loop processing (S2230).

Subsequently, the plan execution instruction program 304 starts loop processing by using the list of the storage service containers 111 (S2240). Subsequently, the plan execution instruction program 304 instructs the target storage service container 111 to execute a plan related to the target storage service container 111 (S2250).

In the case of a plan to move the volume, the plan execution instruction program 304 calls the volume movement program 421 of the target storage service container 111. Accordingly, the volume designated in the plan is moved to the storage service container 111 designated in the plan. In the case of a plan to increase the definition amount of resource of the storage service container 111, the plan execution instruction program 304 calls the storage control resource control program 422 of the target storage service container 111. Accordingly, the amount of available resource of the target storage service container 111 is redefined, and the storage service processing is optimized according to the redefined amount of resource. Examples of the optimization are to dynamically expand a resource usage upper limit by using a function such as hot plug and resource pool constraints when a storage function is provided by a virtual machine or by increasing a work process, a worker thread, or a worker container for performing the storage service when the storage function is provided in the bare metal or the container.

The plan execution instruction program 304 performs the processing of S2250 for all the storage service containers 111 and ends the loop processing (S2260). With this, the plan execution ins-ruction program 304 ends the plan execution instruction processing S2200.

In the present embodiment, when a high load state occurs due to a resource insufficiency in a cluster including a plurality of nodes of the computer system having a software defined storage (SDS) or HCI configuration, actions are executed in the order of priority of (A) an action of increasing the definition amount of resource of the storage service container, (B) an action of moving the application container between the nodes, and (C) an action of moving the application container and the volume between nodes. Thus, the volume migration with a large processing load is not executed as much as possible, and thus, the amount of movement of the volume is reduced. Accordingly, the resource insufficiency due to the volume movement can be reduced.

As stated above, according to the present embodiment, in the computer system constituted by the plurality of physical computers on which the container that performs the storage service and the container on which the application operates operate, the resource insufficiency of the container and the physical computer can be efficiently resolved in a short time so as to suppress disadvantages and processing cost as much as possible. It is possible to further reduce the resource insufficiency due to the volume movement without decreasing the overall processing efficiency.

In the present embodiment, an action of allocating an application having a small number of I/O or the amount of I/O to a computer different from the computer on which the storage service that provides the volume used by this application runs is executed, and an action of allocating an application having a large number of I/O or the amount of I/O to a different computer is not executed. Accordingly, the application and the volume are allocated to the different computers, and thus, it is possible to suppress a decrease in the processing efficiency of the entire computer system.

Modification Example of Embodiment

In the present embodiment, an action (D) of increasing the definition amount of resource of the application may be executed in addition to the above actions (A), (B), and (C). In this case, the action (D) is executed in preference to the actions (B) and (C), so that the amount of volume movement can be reduced and the resource insufficiency due to volume movement can be reduced.

When the resource insufficiency can be resolved while the processing cost is reduced, the priority of executing the actions (A), (B), (C), and (D) is not limited to the above example. The above (A) and/or (B) may be executed.

Other Embodiments

In the above-described embodiment, when the high load state occurs due to the resource insufficiency in the cluster including the plurality of nodes of the computer system having the HCI configuration, the actions are executed in the order of priority of the above (A), (B), and (C).

On the other hand, a predetermined optimization problem is resolved based on an integer programming method, and thus, the actions of the priority of the above (A), (B) and (C) illustrated in the resource insufficiency resolution plan processing (FIG. 15), the specific resource insufficiency resolution plan processing (FIG. 16), and the specific resource insufficiency resolution plan processing for the storage service container (FIG. 17) of the above-described embodiment can be performed in detail according to the performance evaluation of the volume. The embodiment of resolving the optimization problem under a constraint condition will be described as another embodiment.

First, an objective function and a constraint condition of the optimization problem for resolving the resource insufficiency will be described. The optimization problem that minimizes an objective function C_all(k) is expressed by Equation 1.

$$\text{minimize } C_{all}(k) \quad \text{[Math. 1]}$$

-continued $$C_{all}(k) = C(0, 0, k) \times x_0 + \sum_{i=1}^{n} \sum_{j=1}^{m} C(i, j, k) \times x_{ijk}, \forall k$$

A first term C(0, 0, k) of the objective function C_all(k) is a cost value of processing of changing the definition amount of resource of the storage service container. A second term C(i, j, k) is a cost value of processing required when an action of x_ijk is executed. x_0 and x_ijk are variables that use 0 or 1. The action is not executed in the case of 0, and the action is executed in the case of 1. x_0 corresponds to the action of changing the definition amount of resource of the storage service container. In the present embodiment, the plan is established by obtaining the values of x_0 and x_ijk that minimize the objective function C_all(k).

Here, i in Equation 1 and Equation 2 to be described below, and Equation 3 to be described below is a number representing a certain object group (application container and a group of volumes used by the application container). j in Equation 1, Equation 2, and Equation 3 is a number representing an action for a certain object group. Examples of the action include an action of moving only the application container of a certain object group, an action of moving the application container of a certain object group and all the volumes, an action of moving the application container of a certain object group and some volumes, and the like.

The cost of the action of moving only the application container of a certain object group increases as the IOPS and the TransferRate increase, and decreases as the IOPS and the TransferRate decrease.

k in Equation 1, Equation 2, and Equation 3 is a number of the cluster computer. In Equation 1, the objective function is defined for each cluster computer, but one objective function may be defined for all the cluster.

The constraint condition of the optimization problem of Equation 1 is expressed as Equation 2 and Equation 3.

$$R_{target}(k, l) < \sum_{i=1}^{n} \sum_{j=1}^{m} R(i, j, k, l) \times x_{ijk}, \forall k, \forall l \quad \text{[Math. 2]}$$

$$\sum_{j=1}^{m} x_{ijk} \leq 1, \forall l, \forall k \quad \text{[Math. 3]}$$

R_target(k, l) in Equation 2 is the amount of resource of a resource type l to be reduced in a cluster computer k. Here, l in Equation 2 and Equation 3 is a number representing a target resource type. The resource type is the CPU, the memory, the network bandwidth, and the storage capacity. In other words, a solution satisfying this constraint condition is obtained, and thus, it is possible to establish a plan to reduce the amount of required resource.

Equation 3 is a constraint condition in which one action or less is executed for a certain object group.

Next, the resource insufficiency resolution plan processing of the present embodiment will be described.

Figure 23:
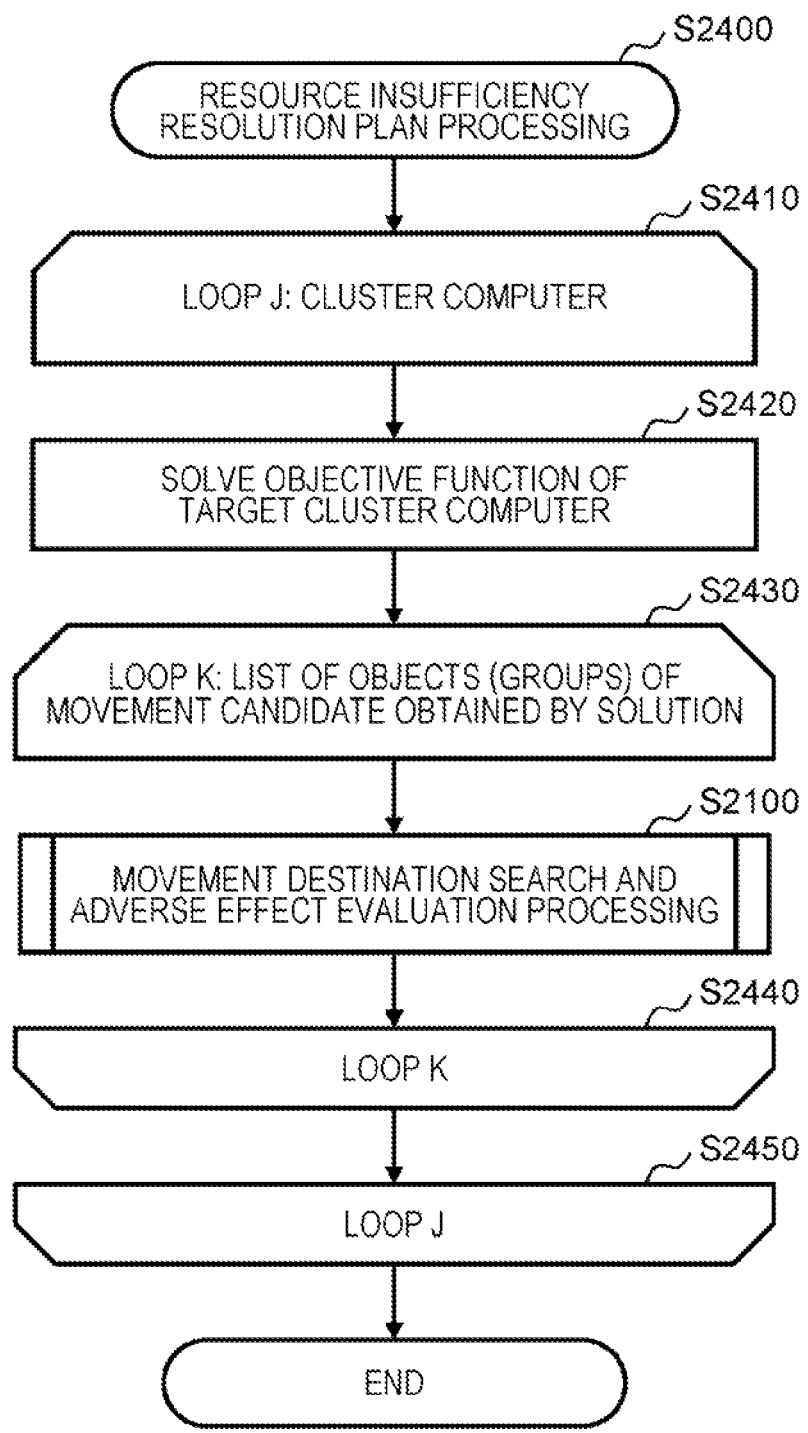
FIG. 23 is a flowchart of resource insufficiency resolution plan processing according to another embodiment.

FIG. 23 is a flowchart of the resource insufficiency resolution plan processing. The resource insufficiency resolution plan processing is executed by the resource insufficiency resolution plan program 303 of the cluster management computer 101. The resource insufficiency resolution plan program 303 is executed by the administrator via the management terminal 103 or the like.

In the resource insufficiency resolution plan processing, the resource insufficiency resolution plan program 303 starts a loop in the list of the cluster computers (S2410). Subsequently, the resource insufficiency resolution plan program 303 solves the objective function of Equation (1) by using a solver for the target cluster computer (S2420). Subsequently, the resource insufficiency resolution plan program 303 starts a loop in the list of objects (groups) of a movement candidate obtained by the solution of the resource insufficiency resolution plan program 303 (S2430).

Subsequently, the resource insufficiency resolution plan program 303 calls the movement destination search and adverse effect evaluation processing for the target object (group) (S2100). The resource insufficiency resolution plan program 303 performs the processing on all the objects (groups) of the movement candidate, ends the loop processing (S2440), and performs the processing on the next cluster computer.

The resource insufficiency resolution plan program 303 performs the processing for all the cluster computers and ends the loop processing (S2450). With this, the resource insufficiency resolution plan processing is ended.

The present invention is not limited to the aforementioned embodiments, and can be appropriately modified and implemented without departing from the spirit of the present invention. In the aforementioned embodiments, a part or all of the processing performed by the CPU may be performed by a dedicated hardware circuit. The programs in the aforementioned embodiments may be installed from a program source. The program source may be a program distribution server or a storage medium (for example, a non-transitory portable storage medium).

What is claimed is:

1. A computer system, comprising:
   a plurality of physical computers including a first physical computer and a second physical computer,
   wherein one or more application instances that perform an application service and a storage service instance that provides a storage service including a volume used by the application instance operate on the first physical computer, and
   wherein the computer system:
     predicts a future resource usage status of the first physical computer;
     creates a first plan to increase an amount of available resource of the storage service instance;
     after creating the first plan, determines whether the second physical computer does not have a resource insufficiency by moving the application instance to the second physical computer;
     when the computer system determines that the second physical computer does not have the resource insufficiency, creates a second plan to move the one or more application instances operating on the first physical computer to the second physical computer based on the predicted future resource usage status; and
     executes the created first plan and the created second plan.

2. The computer system according to claim 1, wherein the computer system selects an application instance to be moved to the second physical computer from among a plurality of application instances running on the first physical computer based on an I/O status for the volume running on the first physical computer.

3. The computer system according to claim 2, wherein the computer system creates a third plan to move, to the second physical computer, a volume used by the application instance to be moved to the second physical computer based on the resource usage status.

4. The computer system according to claim 3, wherein
   the resource usage status is a number of times of I/O per unit time or an amount of transferred data per unit time, and
   the computer system creates the third plan to move, to the second physical computer, the volume used by the application instance to be moved to the second physical computer when the number of times of I/O per unit time or the amount of transferred data per unit time is equal to or greater than a predetermined value.

5. The computer system according to claim 1, wherein the storage service instance and the application instance are virtual computers operating on a host OS or a hypervisor that simulates an independent physical computer.

6. The computer system according to claim 1, wherein the storage service instance and the application instance are containers operating on a container platform that simulates an independent OS space.

7. The computer system according to claim 1, wherein the storage service instance is a process operating on a host OS or a hypervisor running on the physical computer.

8. A computer system, comprising:
   a plurality of physical computers including a first physical computer and a second physical computer,
   wherein one or more application instances that perform an application service and a storage service instance that provides a storage service including a volume used by the application instance operate on the first physical computer, and
   the computer system:
     predicts a future resource usage status of the first physical computer;
     creates a first plan to increase an amount of available resource of the storage service instance;
     after creating the first plan, determines whether the second physical computer does not have a resource insufficiency by moving the application instance to the second physical computer;
     when the computer system determines that the second physical computer does not have the resource insufficiency, creates a second plan to execute an action of decreasing, under a constraint condition, an objective function based on a processing cost value set to each of actions including a first action of increasing an amount of available resource for resolving a resource insufficiency of the storage service instance, a second action of moving the one or more application instances operating on the first physical computer to the second physical computer, and a third action of moving the volume used by the application instance to the second physical computer, based on the predicted future resource usage status; and
     executes the created first plan and the created second plan.

9. The computer system according to claim 8, wherein the computer system sets a processing cost value of the second action according to a number of times of I/O per unit time or an amount of transferred data per unit time for the volume used by the application instance.

10. A control method for a computer system constituted by a plurality of physical computers including a first physical computer and a second physical computer, the method comprising:
    causing one or more application instances that perform an application service and a storage service instance that provides a storage service including a volume used by the application instance to operate on the first physical computer;

predicting, by the computer system, a future resource usage status of the first physical computer;

creating, by the computer system, a first plan to increase an amount of available resource of the storage service instance;

after creating the first plan, determining, by the computer system, whether the second physical computer does not have a resource insufficiency by moving the application instance to the second physical computer;

when the determining that the second physical computer does not have the resource insufficiency, creating, by the computer system, a second plan to move the one or more application instances operating on the first physical computer to the second physical computer based on the predicted future resource usage status; and executing, by the computer system, the first created plan and the second created plan.

* * * * *